(12) United States Patent
Mooney et al.

(10) Patent No.: US 11,148,279 B1
(45) Date of Patent: Oct. 19, 2021

(54) CUSTOMIZED CONFIGURATION FOR AN EXOSKELETON CONTROLLER

(71) Applicant: Dephy, Inc., Maynard, MA (US)

(72) Inventors: Luke Mooney, Sudbury, MA (US); Jean-François Duval, Belmont, MA (US); Rachel Harris, Cambridge, MA (US); Jonathan Kaplan, Waltham, MA (US); Matthew Mooney, Westford, MA (US); William Marvin, Canton, MA (US)

(73) Assignee: Dephy, Inc., Maynard, MA (US)

( * ) Notice: Subject to any disclaimer, the term of this patent is extended or adjusted under 35 U.S.C. 154(b) by 0 days.

(21) Appl. No.: 17/109,911

(22) Filed: Dec. 2, 2020

Related U.S. Application Data

(60) Provisional application No. 63/034,774, filed on Jun. 4, 2020.

(51) Int. Cl.
*A61H 3/00* (2006.01)
*B25J 9/00* (2006.01)
*B25J 9/16* (2006.01)

(52) U.S. Cl.
CPC .......... *B25J 9/0006* (2013.01); *B25J 9/161* (2013.01); *B25J 9/1633* (2013.01)

(58) Field of Classification Search
CPC ... A61B 2505/09; A61B 5/1116; A61B 5/112; A61B 5/224; A61B 5/486; A61B 5/0024;
(Continued)

(56) References Cited

U.S. PATENT DOCUMENTS 2,516,872 A 8/1950 Hauser et al.
2,573,698 A 11/1951 Ellery
(Continued)

FOREIGN PATENT DOCUMENTS

CA 2937610 A1 7/2009
CN 202679044 U 1/2013
(Continued)

OTHER PUBLICATIONS

Dollar et al., Active Orthoses for the Lower-Limbs: Challenges and State of the Art, 2008, IEEE, p. 968-977 (Year: 2008), date is not available.
(Continued)

*Primary Examiner* — Dalena Tran
(74) *Attorney, Agent, or Firm* — Foley & Lardner LLP

(57) ABSTRACT

Systems and methods for providing a customized configuration for a controller of an exoskeleton device. A device can receive, via a user interface, feedback from a user indicative of a performance of the user during a movement event. The device can determine characteristics of the user for performing the movement event using a first exoskeleton boot and a second exoskeleton boot and identify properties of a route for the movement event. The device can determine using the characteristics of the user, the feedback and the properties of the route, control parameters for the first exoskeleton boot and the second exoskeleton boot to execute the movement event. The device can apply the control parameters to the first exoskeleton boot and the second exoskeleton boot for the user to operate the first exoskeleton boot and the second exoskeleton boot during the movement event.

20 Claims, 17 Drawing Sheets

(58) Field of Classification Search
CPC .............. A61B 3/00; A61H 2201/165; A61H 2201/5043; A61H 2201/5058; A61H 3/00; G08C 17/00; G08C 17/02
USPC ................. 601/5, 33, 40; 623/24, 44, 57
See application file for complete search history.

(56) References Cited

U.S. PATENT DOCUMENTS

| | | | |
|---|---|---|---|
| 3,064,644 A | 11/1962 | Patterson | |
| 5,490,831 A | 2/1996 | Myers et al. | |
| 5,685,830 A * | 11/1997 | Bonutti | A61F 5/0123 601/33 |
| 6,872,187 B1 | 3/2005 | Stark et al. | |
| 7,153,242 B2 | 12/2006 | Goffer | |
| 7,431,737 B2 | 10/2008 | Ragnarsdottir et al. | |
| 7,531,006 B2 | 5/2009 | Clausen et al. | |
| 7,628,766 B1 | 12/2009 | Kazerooni et al. | |
| 7,811,333 B2 | 10/2010 | Jonsson et al. | |
| 8,435,309 B2 | 5/2013 | Gilbert et al. | |
| 8,516,918 B2 | 8/2013 | Jacobsen et al. | |
| 8,585,620 B2 | 11/2013 | McBean et al. | |
| 8,597,369 B2 | 12/2013 | Hansen et al. | |
| 8,734,528 B2 | 5/2014 | Herr et al. | |
| 8,764,850 B2 | 7/2014 | Hansen et al. | |
| 8,784,350 B2 | 7/2014 | Cohen | |
| 8,790,282 B2 | 7/2014 | Jung et al. | |
| 8,801,802 B2 | 8/2014 | Oddsson et al. | |
| 8,864,846 B2 | 10/2014 | Herr et al. | |
| 8,870,801 B2 | 10/2014 | Tomiyama et al. | |
| 8,870,967 B2 | 10/2014 | Herr et al. | |
| 9,017,419 B1 | 4/2015 | Landry et al. | |
| 9,066,819 B2 | 6/2015 | Gramnaes | |
| 9,078,774 B2 | 7/2015 | Jonsson et al. | |
| 9,198,821 B2 | 12/2015 | Unluhisarcikli et al. | |
| 9,333,097 B2 | 5/2016 | Herr et al. | |
| 9,339,397 B2 | 5/2016 | Herr et al. | |
| 9,345,608 B2 | 5/2016 | Phillips | |
| 9,480,618 B2 | 11/2016 | Hsiao-Wecksler et al. | |
| 9,539,117 B2 | 1/2017 | Herr et al. | |
| 9,554,922 B2 | 1/2017 | Casler et al. | |
| 9,662,262 B2 | 5/2017 | Hollander et al. | |
| 9,693,883 B2 | 7/2017 | Herr et al. | |
| 9,707,104 B2 | 7/2017 | Clausen | |
| 9,737,419 B2 | 8/2017 | Herr et al. | |
| 9,808,390 B2 | 11/2017 | Caires et al. | |
| 9,839,552 B2 | 12/2017 | Han et al. | |
| 9,872,782 B2 | 1/2018 | Herr et al. | |
| 9,907,722 B2 | 3/2018 | Aguirre-Ollinger et al. | |
| 9,925,071 B2 | 3/2018 | Langlois et al. | |
| 9,980,873 B2 | 5/2018 | Tung et al. | |
| 10,195,057 B2 | 2/2019 | Clausen | |
| 10,251,762 B2 | 4/2019 | Langlois | |
| 10,307,271 B2 | 6/2019 | Holgate et al. | |
| 10,307,272 B2 | 6/2019 | Herr et al. | |
| 10,335,294 B2 | 7/2019 | Huang et al. | |
| 10,369,023 B2 | 8/2019 | Simon et al. | |
| 10,405,996 B2 | 9/2019 | Langlois | |
| 10,406,002 B2 | 9/2019 | Herr et al. | |
| 10,426,637 B2 | 10/2019 | Tong et al. | |
| 10,463,561 B2 | 11/2019 | Zhang et al. | |
| 10,485,681 B2 | 11/2019 | Herr et al. | |
| 10,532,000 B1 | 1/2020 | De Sapio et al. | |
| 10,537,449 B2 | 1/2020 | Han et al. | |
| 10,561,563 B2 | 2/2020 | Herr et al. | |
| 10,576,620 B1 | 3/2020 | Chou et al. | |
| 2006/0184280 A1 | 8/2006 | Oddsson et al. | |
| 2007/0225620 A1 * | 9/2007 | Carignan | B25J 9/0006 601/5 |
| 2009/0210093 A1 | 8/2009 | Jacobsen et al. | |
| 2010/0198124 A1 | 8/2010 | Bhugra | |
| 2011/0066088 A1 | 3/2011 | Little et al. | |
| 2012/0089063 A1 | 4/2012 | Olson et al. | |
| 2012/0256381 A1 * | 10/2012 | Bradshaw | A43C 15/068 280/11.3 |
| 2012/0289870 A1 | 11/2012 | Hsiao-Wecksler et al. | |
| 2013/0090580 A1 * | 4/2013 | Hong | B25J 9/0072 601/33 |
| 2013/0231595 A1 | 9/2013 | Zoss et al. | |
| 2014/0100494 A1 | 4/2014 | Sarkodie-Gyan et al. | |
| 2014/0330431 A1 | 11/2014 | Hollander et al. | |
| 2015/0141878 A1 | 5/2015 | Roy et al. | |
| 2015/0164731 A1 | 6/2015 | Kwak et al. | |
| 2015/0173993 A1 | 6/2015 | Walsh et al. | |
| 2015/0196403 A1 | 7/2015 | Kim et al. | |
| 2016/0107309 A1 | 4/2016 | Walsh et al. | |
| 2016/0143800 A1 | 5/2016 | Hyung et al. | |
| 2016/0278948 A1 | 9/2016 | Piercy et al. | |
| 2016/0331557 A1 | 11/2016 | Tong et al. | |
| 2016/0331624 A1 | 11/2016 | Sankai et al. | |
| 2017/0119132 A1 * | 5/2017 | Pruess | F16M 11/2085 |
| 2017/0202724 A1 | 7/2017 | De Rossi et al. | |
| 2017/0354529 A1 | 12/2017 | Han et al. | |
| 2018/0104075 A1 | 4/2018 | Mooney et al. | |
| 2018/0125738 A1 | 5/2018 | Witte et al. | |
| 2018/0177665 A1 | 6/2018 | Rogozinski | |
| 2018/0193172 A1 | 7/2018 | Smith et al. | |
| 2018/0200135 A1 | 7/2018 | Tung et al. | |
| 2018/0325764 A1 | 11/2018 | Yagi | |
| 2019/0011743 A1 | 1/2019 | Yan et al. | |
| 2019/0038448 A1 | 2/2019 | Choi et al. | |
| 2019/0070060 A1 | 3/2019 | Choi et al. | |
| 2019/0083002 A1 | 3/2019 | Jang et al. | |
| 2019/0105215 A1 | 4/2019 | Dalley et al. | |
| 2019/0159728 A1 | 5/2019 | Pritchard et al. | |
| 2019/0159954 A1 | 5/2019 | Ozsecen et al. | |
| 2019/0160321 A1 | 5/2019 | Ozsecen et al. | |
| 2019/0175365 A1 | 6/2019 | Herr et al. | |
| 2019/0183713 A1 | 6/2019 | Sankai | |
| 2019/0254908 A1 | 8/2019 | Ortlieb et al. | |
| 2019/0254909 A1 | 8/2019 | Lee et al. | |
| 2019/0314185 A1 | 10/2019 | Yuge et al. | |
| 2019/0328552 A1 | 10/2019 | Herr et al. | |
| 2019/0328604 A1 | 10/2019 | Contreras-Vidal et al. | |
| 2019/0343707 A1 | 11/2019 | Riener et al. | |
| 2020/0016020 A1 | 1/2020 | Mooney et al. | |
| 2020/0197253 A1 | 6/2020 | Park et al. | |
| 2020/0253774 A1 | 8/2020 | Pismennaya et al. | |

FOREIGN PATENT DOCUMENTS

| | | |
|---|---|---|
| CN | 105213155 A | 1/2016 |
| CN | 103813772 B | 7/2016 |
| CN | 104644381 B | 8/2016 |
| CN | 104983543 B | 8/2016 |
| CN | 107115191 A | 9/2017 |
| CN | 107874984 A | 4/2018 |
| CN | 105213153 B | 6/2018 |
| CN | 105963100 B | 7/2018 |
| CN | 108283564 A | 7/2018 |
| CN | 108338896 A | 7/2018 |
| CN | 108451748 A | 8/2018 |
| CN | 106491319 B | 12/2018 |
| CN | 105456004 B | 2/2019 |
| CN | 109646245 A | 4/2019 |
| CN | 209107991 U | 7/2019 |
| CN | 209270231 | 8/2019 |
| CN | 110327189 A | 10/2019 |
| CN | 110478191 A | 11/2019 |
| CN | 110575350 A | 12/2019 |
| EP | 2 621 413 B1 | 6/2014 |
| EP | 2 564 817 B1 | 1/2019 |
| IN | 201631013395 A | 10/2017 |
| JP | 5935177 B2 | 6/2016 |
| KR | 20140107029 A | 9/2014 |
| WO | WO-2016/180073 A1 | 11/2016 |
| WO | WO-2016/182473 A1 | 11/2016 |

(56) References Cited

FOREIGN PATENT DOCUMENTS

WO     WO-2018/023109 A1     2/2018
WO     WO-2019/160532     8/2019

OTHER PUBLICATIONS

Dollar et al., Lower Extremity Exoskeletons and Active Orthoses: Challenges and State-of-the-Art, 2008, IEEE, p. 144-158 (Year:2008), date is not available.
Goldfarb et al. Design of a Controlled-Brake Orthosis for FES-aided gait, 1996, IEEE, p. 13-24 (Year: 1996), date is not available.
International Search Report and Written Opinion on PCT/US2020/059866 dated Feb. 4, 2021, 8 pages.
Kim et al., Mechanical Design of the Hanyang Exoskeleton Assistive Robot (HEXAR), 2014, IEEE, 479-484 (Year: 2014), date is not available.
Haque et al., Design and Preliminary Testing of an Insrumented Exoskeleton for Walking Gait Measurement, 2019, IEEE, 2019, 6 pages, date is not available.

\* cited by examiner

CUSTOMIZED CONFIGURATION FOR AN EXOSKELETON CONTROLLER

CROSS-REFERENCES TO RELATED APPLICATIONS

This application claims the benefit of priority under 35 U.S.C. § 119 to U.S. Provisional Patent Application No. 63/034,774, filed on Jun. 4, 2020, tilted "SYSTEMS AND METHODS FOR AN EXOSKELETON USER APPLICATION," which is incorporated herein by reference in its entirety.

BACKGROUND

Exoskeletons can be worn by a user to facilitate movement of limbs of the user.

SUMMARY

Systems, methods and devices of the present technical solution are directed to a user application to provide customized configuration for a controller of an exoskeleton device. An exoskeleton device, such as but not limited to, an exoskeleton boot can be worn by a user on each lower limb (e.g., right leg, left leg) to aid the user in performing movements and/or activities (e.g., walking, running, hiking). The exoskeleton boots can provide force or torque to the respective limb to reduce an amount of force provided by the user to perform the movement and reduce a physiological impact on the user during the movement. The exoskeleton can augment or otherwise change a behavior of the user while performing different movements. Further, the exoskeleton device can its behavior based in part on the behavior and/or performance of the user during the movement.

The exoskeleton devices described herein can provide a feedback system for a user to interact with an exoskeleton device to provide movement characteristics (e.g., limb movement, joint movement, measurements) of the user during a movement and enable a customized configuration for operating the exoskeleton device, customized for the particular user. The feedback system can include an application provided to the user through the exoskeleton device and/or a client device (e.g., phone application, smartwatch application, computer application). The user can enter different characteristics and/or measurements (e.g., age, weight, height, activity level, type of activity) to customize the control of the exoskeleton device for the user. The exoskeleton device can generate control parameters based in part on the provided user performance characteristics and/or measurements. In embodiments, the exoskeleton device can update or modify control parameters during a current movement based in part on the provided user performance characteristics and/or measurements to improve a performance of the user. The exoskeleton device can provide visual, haptic and/or audio feedback to the user to indicate if changes were made, what changes were made and/or indicate if the respective exoskeleton device is behaving appropriately.

In at least one aspect, a method for controlling operation of exoskeleton boots is provided. The method can include receiving, by a device via a user interface, feedback from a user indicative of a performance of the user during a movement event. The method can include determining, by the device, characteristics of the user for performing the movement event using a first exoskeleton boot and a second exoskeleton boot. The method can include identifying, by the device, properties of a route for the movement event. The method can include determining, by a device using the characteristics of the user, the feedback and the properties of the route, control parameters for the first exoskeleton boot and the second exoskeleton boot to execute the movement event. The method can include applying, by the device, the control parameters to the first exoskeleton boot and the second exoskeleton boot for the user to operate the first exoskeleton boot and the second exoskeleton boot during the movement event.

In embodiments, the characteristics of the user can include at least one of: age, weight, height, gate information, or activity level. The properties of the route can include at least one of: type of activity, distance, start point, end point, terrain, or altitude. The control parameters can include at least one of: battery requirements, power level, power levels for each step performed using the first exoskeleton boot and the second exoskeleton boot.

In some embodiments, the method can include modifying, by the device responsive to a measurement of the user during the movement event, the control parameters during the movement event to modify a power provided to the first exoskeleton boot and the second exoskeleton boot during the movement event. The method can include establishing, by the device, a connection between the first exoskeleton boot and the second exoskeleton boot to communicate one or more measurements during the movement event. The method can include determining, by the device responsive to an input from the user, a step missed during the movement event. The method can include generating, by the device, a notification indicating the step missed during the movement event.

The method can include generating, by the device, a group profile for a group of users based on one or more previous movement events. The method can include modifying, by the device using group profile, the control parameters for the user to operate the first exoskeleton boot and the second exoskeleton boot during the movement event. The method can include determining, by the device, a score for the user during the movement event based on measurements from the first exoskeleton boot and the second exoskeleton boot.

In at least one aspect, a method for controlling operation of exoskeleton boots is provided. The method can include establishing, by a device responsive to a request from a user, a connection between a first exoskeleton boot and a second exoskeleton boot. The method can include identifying, by the device, a user profile associated with the user. The method can include performing, by the device, a range calculation for a movement event based on the user profile and properties of the first exoskeleton boot and the second exoskeleton boot. The method can include providing, by the device responsive to the range calculation, a first value of power to the first exoskeleton boot and a second value of power to the second exoskeleton boot to execute the movement event.

In some embodiments, the method can include calibrating, by the device using the connection, control parameters between the first exoskeleton boot and the second exoskeleton boot. The method can include determining, by the device responsive to the range calculation, the first value of power for the first exoskeleton boot and the second value of power for the second exoskeleton boot to execute the movement event based on at least one of: a weight of the user, a height of the user or an age of the user. The method can include receiving, by the device from a user interface, an augmentation value for the first exoskeleton boot and the second exoskeleton boot, the augmentation value indicative of a level of assistance provided by the first exoskeleton boot and the second exoskeleton boot to the user during the movement event.

In embodiments, the method can include modifying, by the device responsive to a measurement indicative of a performance of the user during the movement event, an augmentation value for the first exoskeleton boot and the second exoskeleton boot. The augmentation value can be indicative of a level of assistance provided by the first exoskeleton boot and the second exoskeleton boot to the user during the movement event. The method can include determining, by the device, a measurement of a battery status or battery requirement for the movement event using a range calculation and a provided augmentation value. The method can include providing, by the device to the user through a user interface, a first step count for the first exoskeleton boot and a second step count for the second exoskeleton boot. The first step count can indicate a number of steps performed by the first exoskeleton boot during the movement event and the second step count can indicate a number of steps performed by the second exoskeleton boot during the movement event. The method can include continuously modifying, the device responsive to actions by the user, the first step count for the first exoskeleton boot and the second step count for the second exoskeleton boot during the movement event.

In at least one aspect, a device for controlling operation of exoskeleton boots is provided. The device can include a processor coupled to memory. The processor can be configured to receive, from a use interface communicatively coupled to the device, feedback from the user indicative of a performance of the user during a movement event. The processor can be configured to determine characteristics of the user for performing the movement event using a first exoskeleton boot and a second exoskeleton boot. The processor can be configured to identify properties of a route for the movement event. The processor can be configured to determine, using the characteristics of the user, the feedback, and the properties of the route, control parameters for the first exoskeleton boot and the second exoskeleton boot to execute the movement event. The processor can be configured to apply the control parameters to the first exoskeleton boot and the second exoskeleton boot for the user to operate the first exoskeleton boot and the second exoskeleton boot during the movement event.

In some embodiments, the processor can be configured to modify, responsive to a measurement of the user during the movement event, the control parameters during the movement event to modify a power provided to the first exoskeleton boot and the second exoskeleton boot during the movement event. The processor can be configured to establish a connection between the first exoskeleton boot and the second exoskeleton boot to communicate one or more measurements during the movement event.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

This disclosure relates generally to performance enhancing wearable technologies. Particularly, this disclosure relates to apparatus, systems and methods for providing customized configuration for a controller of an exoskeleton device through a user application and/or user feedback.

I. Exoskeleton Overview

Exoskeletons (e.g., battery-powered active exoskeleton, battery-powered active exoskeleton boot, lower limb exoskeleton, knee exoskeleton, or back exoskeleton) can include devices worn by a person to augment physical abilities. Exoskeletons can be considered passive (e.g., not requiring an energy source such as a battery) or active (e.g., requiring an energy source to power electronics and usually one or many actuators). Exoskeletons may be capable of providing large amounts of force, torque and/or power to the human body in order to assist with motion.

Exoskeletons can transfer energy to the user or human. Exoskeletons may not interfere with the natural range of motion of the body. For example, exoskeletons can allow a user to perform actions (e.g., walking, running, reaching, or jumping) without hindering or increasing the difficulty of performing these actions. Exoskeletons can reduce the difficulty of performing these actions by reducing the energy or effort the user would otherwise exert to perform these actions. Exoskeletons can convert the energy into useful mechanical force, torque, or power. Onboard electronics (e.g., controllers) can control the exoskeleton. Output force and torque sensors can also be used to make controlling easier.

Figure 1:
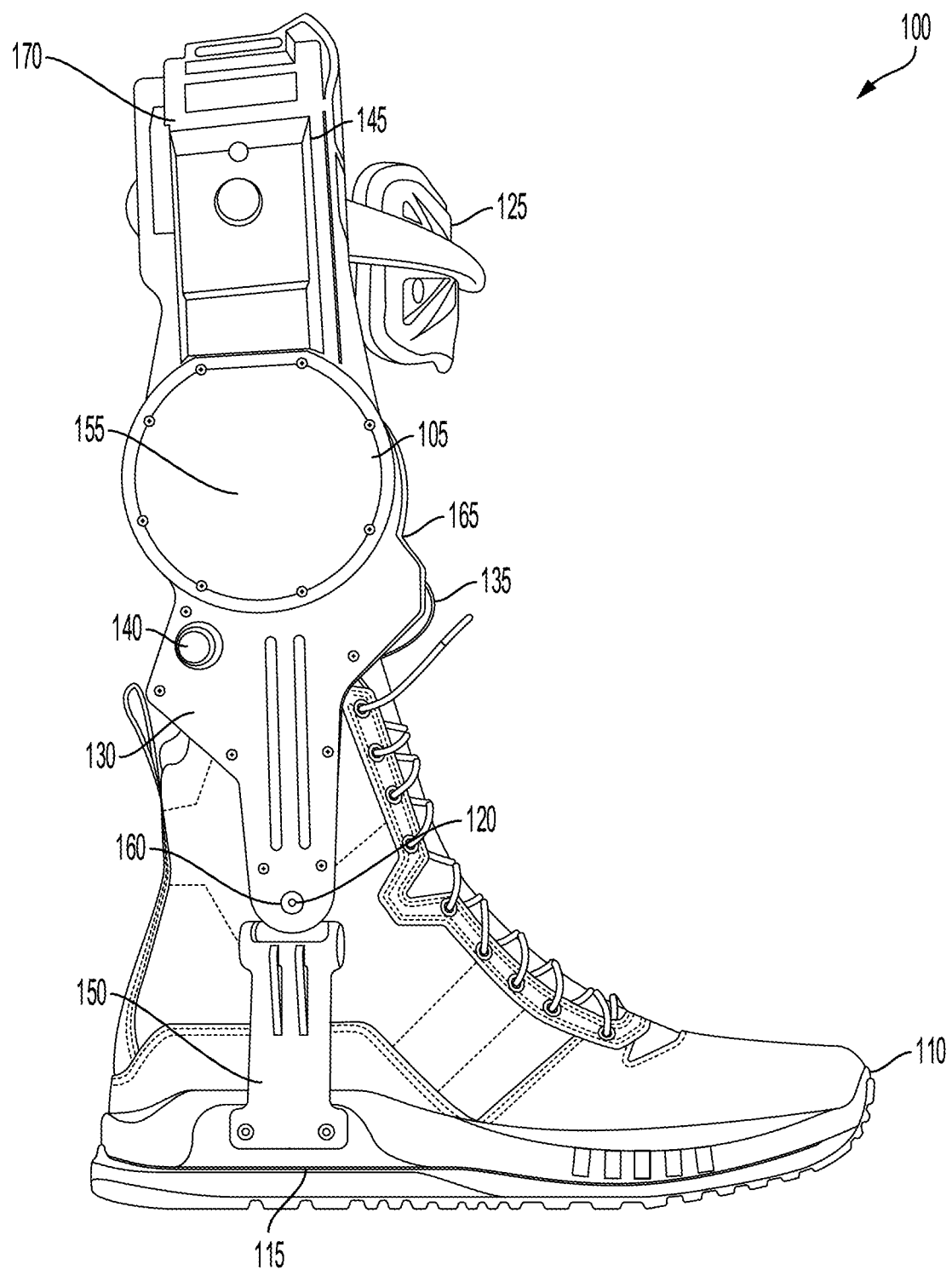
FIG. 1 illustrates a schematic diagram of an exoskeleton, according to an embodiment.

FIG. 1 illustrates a schematic diagram of an exoskeleton 100. The exoskeleton 100 can be referred to as a lower limb exoskeleton, lower limb exoskeleton assembly, lower limb exoskeleton system, ankle exoskeleton, ankle foot orthosis, knee exoskeleton, hip exoskeleton, exoskeleton boot, or exoboot. The exoskeleton 100 can include a water resistant active exoskeleton boot. For example, the exoskeleton 100 can resist the penetration of water into the interior of the exoskeleton 100. The exoskeleton 100 can include a water resistant active exoskeleton boot. For example, the exoskeleton 100 can be impervious to liquids (e.g., water) and non-liquids (e.g., dust, dirt, mud, sand, or debris). The exoskeleton 100 can remain unaffected by water or resist the ingress of water, such as by decreasing a rate of water flow into the interior of the exoskeleton 100 to be less than a target rate indicative of being water resistant or waterproof. For example, the exoskeleton 100 can operate in 3 feet of water for a duration of 60 minutes. The exoskeleton 100 can have an ingress protection rating (IP) rating of 68. The exoskeleton 100 can have a National Electrical Manufacturer Association (NEMA) rating of 4X, which can indicate that the exoskeleton 100 has a degree of protection with respect to harmful effects on the equipment due to the ingress of water (e.g., rain, sleet, snow, splashing water, and hose directed water), and that the exoskeleton can be undamaged by the external formation of ice on the enclosure.

The exoskeleton 100 can include a shin pad 125 (e.g., shin guard). The shin pad 125 can be coupled to a shin of a user below a knee of the user. The shin pad 125 can be coupled to the shin of the user to provide support. The shin pad 125 can include a piece of equipment to protect the user from injury. For example, the shin pad 125 can protect the lower extremities of the user from external impact. The shin pad 125 can interface with the shin of the user. The shin pad 125 can include a band (e.g., adjustable band) configured to wrap around the shin of the user. The shin pad 125 can secure the upper portion of the exoskeleton 100 to the body of the user. The shin pad 125 can secure or help secure the exoskeleton 100 to the shin, leg, or lower limb of the user. The shin pad 125 can provide structural integrity to the exoskeleton 100. The shin pad 125 can support other components of the exoskeleton 100 that can be coupled to the shin pad 125. The shin pad 125 can be made of lightweight, sturdy, and/or water resistant materials. For example, the shin pad 125 can be made of plastics, aluminum, fiberglass, foam rubber, polyurethane, and/or carbon fiber.

The exoskeleton 100 can include one or more housings 105. At least one of the one or more housings 105 can be coupled to the shin pad 125 below the knee of the user. The shin pad 125 can be coupled to the at least one housing via a shin lever. The shin lever can extend from the at least one housing to the shin pad 125. The shin lever can include a mechanical structure that connects the shin pad 125 to a chassis. The chassis can include a mechanical structure that connects static components.

The one or more housings 105 can enclose electronic circuitry (e.g., electronic circuitry 505). The one or more housings 105 can encapsulate some or all the electronics of the exoskeleton 100. The one or more housings 105 can include an electronics cover (e.g., case). The one or more housings 105 can enclose an electric motor (e.g., motor 330). The electric motor can generate torque about an axis of rotation of an ankle joint of the user. The ankle joint can allow for dorsiflexion and/or plantarflexion of the user's foot. The exoskeleton 100 can include an ankle joint component 120 that rotates about the axis of rotation the ankle joint. The ankle joint component 120 can be positioned around or adjacent to the ankle joint.

The exoskeleton 100 can include a rotary encoder 155 (e.g., shaft encoder, first rotary encoder, or motor encoder). The rotary encoder 155 can be enclosed within the one or more housings 105. The rotary encoder 155 can measure an angle of the electric motor. The angle of the electric motor can be used by the controller to determine an amount of torque applied by the exoskeleton 100. For example, the angle of the electric motor can correspond to an amount of torque applied by the exoskeleton 100. An absolute angle of the electric motor can correspond to an amount of torque applied by the exoskeleton 100. The rotary encoder 155 can include an inductive encoder. The ankle joint component 120 can be actuated by a motor (e.g., electric motor). The rotary encoder 155 can include a contactless magnetic encoder or an optical encoder.

The exoskeleton 100 can include a second rotary encoder 160 (e.g., ankle encoder). The second rotary encoder 160 can measure an angle of the ankle joint. The angle of the ankle joint can be used by the controller to determine an amount of torque applied by the exoskeleton 100. The second rotary encoder 160 can include a first component enclosed in the one or more housings 105 and in communication with the electronic circuitry 505. The second rotary encoder 160 can include a second component located outside the one or more housings 105 and configured to interact with the first component. The second rotary encoder 160 can include a contactless magnetic encoder, a contactless inductive encoder, or an optical encoder. The second rotary encoder 160 can detect the angle of the ankle joint while the rotary encoder 155 can detect the angle of the electric motor. The angle of the electric motor can be different from the angle of the ankle joint. The angle of the electric motor can be independent of the angle of the ankle joint. The angle of the ankle joint can be used to determine an output (e.g., torque) of the electric motor. The ankle joint component 120 can be coupled to the second rotary encoder 160.

The one or more housings 105 can encapsulate electronics that are part of the exoskeleton 100. The one or more housings 105 can form a fitted structure (e.g., clamshell structure) to enclose the electronic circuitry and the electric motor. The fitted structure can be formed from two or more individual components. The individual components of the fitted structure can be joined together to form a single unit. The one or more housings 105 can be formed of plastic or metal (e.g., aluminum). An adhesive sealant can be placed between individual components of the fitted structure and under the electronics cover. A gasket can be placed between individual components of the fitted structure and under the electronics cover. The gasket can be placed in the seam between the individual components of the fitted structure.

A sealant 165 can be placed in contact with the one or more housings 105 to close the one or more housings 105 and prevent an ingress of water into the one or more housings 105. The sealant 165 used to close the one or more housings 105 can include an adhesive sealant (e.g., super glue, epoxy resin, or polyvinyl acetate). The adhesive sealant can include a substance used to block the passage of fluids through the surface or joints of the one or more housings 105. The sealant 165 used to close the one or more housings 105 can include epoxy. The sealant 165 can permanently seal or close the one or more housings 105. For example, the sealant 165 can seal or close the one or more housings 105 such that the one or more housings are not removably attached to one another.

The exoskeleton 100 can couple with a boot 110. For example, the exoskeleton 100 can be attached to the boot 110. The boot 110 can be worn by the user. The boot 110 can be connected to the exoskeleton 100. The exoskeleton 100 can be compatible with different boot shapes and sizes.

The exoskeleton 100 can include an actuator 130 (e.g., actuator lever arm, or actuator module). The actuator 130 can include one or more of the components in the exoskeleton 100. For example, the actuator 130 can include the one or more housings 105, the footplate 115, the ankle joint component 120, the actuator belt 135, and the post 150, while excluding the boot 110. The boot 110 can couple the user to the actuator 130. The actuator 130 can provide torque to the ground and the user.

The exoskeleton 100 can include a footplate 115 (e.g., carbon insert, carbon shank). The footplate 115 can include a carbon fiber structure located inside of the sole of the boot 110. The footplate 115 can be made of a carbon-fiber composite. The footplate 115 can be inserted into the sole of the boot 110. The footplate 115 can be used to transmit torque from the actuator 130 to the ground and to the user. The footplate 115 can be located in the sole of the exoskeleton 100. This footplate 115 can have attachment points that allow for the connection of the exoskeleton's mechanical structure. An aluminum insert with tapped holes and cylindrical bosses can be bonded into the footplate 115. This can create a rigid mechanical connection to the largely compliant boot structure. The bosses provide a structure that can be used for alignment. The footplate 115 can be sandwiched between two structures, thereby reducing the stress concentration on the part. This design can allow the boot to function as a normal boot when there is no actuator 130 attached.

The exoskeleton 100 can include an actuator belt 135 (e.g., belt drivetrain). The actuator belt 135 can include a shaft that is driven by the motor and winds the actuator belt 135 around itself. The actuator belt 135 can include a tensile member that is pulled by the spool shaft and applies a force to the ankle lever. Tension in the actuator belt 135 can apply a force to the ankle lever. The exoskeleton 100 can include an ankle lever. The ankle lever can include a lever used to transmit torque to the ankle. The exoskeleton 100 can be used to augment the ankle joint.

The exoskeleton 100 can include a power button 140 (e.g., switch, power switch). The power button 140 can power the electronics of the exoskeleton 100. The power button 140 can be located on the exterior of the exoskeleton 100. The power button 140 can be coupled to the electronics in the interior of the exoskeleton 100. The power button 140 can be electrically connected to an electronic circuit. The power button 140 can include a switch configured to open or close the electronic circuit. The power button 140 can include a low-power, momentary push-button configured to send power to a microcontroller. The microcontroller can control an electronic switch.

The exoskeleton 100 can include a battery holder 170 (e.g., charging station, dock). The battery holder 170 can be coupled to the shin pad 125. The battery holder 170 can be located below the knee of the user. The battery holder 170 can be located above the one or more housings 105 enclosing the electronic circuitry. The exoskeleton 100 can include a battery module 145 (e.g., battery). The battery holder 170 can include a cavity configured to receive the battery module 145. A coefficient of friction between the battery module 145 and the battery holder 170 can be established such that the battery module 145 is affixed to the battery holder 170 due to a force of friction based on the coefficient of friction and a force of gravity. The battery module 145 can be affixed to the battery holder 170 absent a mechanical button or mechanical latch. The battery module 145 can be affixed to the battery holder 170 via a lock, screw, or toggle clamp. The battery holder 170 and the battery module 145 can be an integrated component (e.g., integrated battery). The integrated battery can be supported by a frame of the exoskeleton 100 as opposed to having a separated enclosure. The integrated battery can include a charging port. For example, the charging port can include a barrel connector or a bullet connector. The integrated battery can include cylindrical cells or prismatic cells.

The battery module 145 can power the exoskeleton 100. The battery module 145 can include one or more electrochemical cells. The battery module 145 can supply electric power to the exoskeleton 100. The battery module 145 can include a power source (e.g., onboard power source). The power source can be used to power electronics and one or more actuators. The battery module 145 can include a battery pack. The battery pack can be coupled to the one or more housings 105 below a knee of the user. The battery pack can include an integrated battery pack. The integrated battery pack can remove the need for power cables, which can reduce the snag hazards of the system. The integrated battery pack can allow the system to be a standalone unit mounted to the user's lower limb. The battery module 145 can include a battery management system 324 to perform various operations. For example, the system can optimize the energy density of the unit, optimize the longevity of the cells, and enforce safety protocols to protect the user.

The battery module 145 can include a removable battery. The battery module 145 can be referred to as a local battery because it is located on the exoboot 100 (e.g., on the lower limb or below the knee of the user), as opposed to located on a waist or back of the user. The battery module 145 can include a weight-mounted battery, which can refer to the battery being held in place on the exoboots 100 via gravity and friction, as opposed to a latching mechanism. The battery module 145 can include a water resistant battery or a waterproof battery. The exoskeleton 100 and the battery module 145 can include water resistant connectors.

The battery module 145 can include a high-side switch (e.g., positive can be interrupted). The battery module 145 can include a ground that is always connected. The battery module 145 can include light emitting diodes (LEDs). For example, the battery module 145 can include three LEDs used for a user interface. The LEDs can be visible from one lens so that the LEDs appear as one multicolor LED. The LEDs can blink in various patterns and/or colors to communicate a state of the battery module 145 (e.g., fully charged, partially charged, low battery, or error).

The exoskeleton 100 can include a post 150. The post 150 can include a mechanical structure that connects to the boot 110. The post 150 can couple the ankle joint component 120 with the footplate 115. The post 150 can be attached at a first end to the footplate 115. The post 150 can be attached at a second end to the ankle joint component 120. The post 150 can pivot about the ankle joint component 120. The post 150 can include a mechanical structure that couples the footplate 115 with the ankle joint component 120. The post 150 can include a rigid structure. The post 150 can be removably attached to the footplate 115. The post 150 can be removably attached to the ankle joint component 120. For example, the post 150 can be disconnected from the ankle joint component 120.

The exoskeleton 100 can include a rugged system used for field testing. The exoskeleton 100 can include an integrated ankle lever guard (e.g., nested lever). The exoskeleton 100 can include a mechanical shield to guard the actuator belt 135 and ankle lever transmission from the environment. The housing structure of the system can extend to outline the range of travel of the ankle lever (e.g., lever arm 1140) on the lateral and medial side.

II. Active Exoskeleton with Local Battery

Exoskeletons 100 can transform an energy source into mechanical forces that augment human physical ability. Exoskeletons 100 can have unique power requirements. For example, exoskeletons 100 can use non-constant power levels, such as cyclical power levels with periods of high power (e.g., 100 to 1000 Watts) and periods of low or negative power (e.g., 0 Watts). Peaks in power can occur once per gait cycle. Batteries configured to provide power to the exoskeleton 100 can be the source of various issues. For example, batteries located near the waist of a user can require exposed cables that extend from the battery to the lower limb exoskeleton. These cables can introduce snag hazards, make the device cumbersome, and add mass to the system. Additionally, long cables with high peak power can result in excess radio emissions and higher voltage drops during high current peaks. Thus, systems, methods and apparatus of the present technical solution provide an exoskeleton with a local battery that can perform as desired without causing snag hazards, power losses, and radio interference. Additionally, the battery can be located close to the knee such that the mass felt by the user is reduced as compared to a battery located close the foot of the user.

Figure 2:
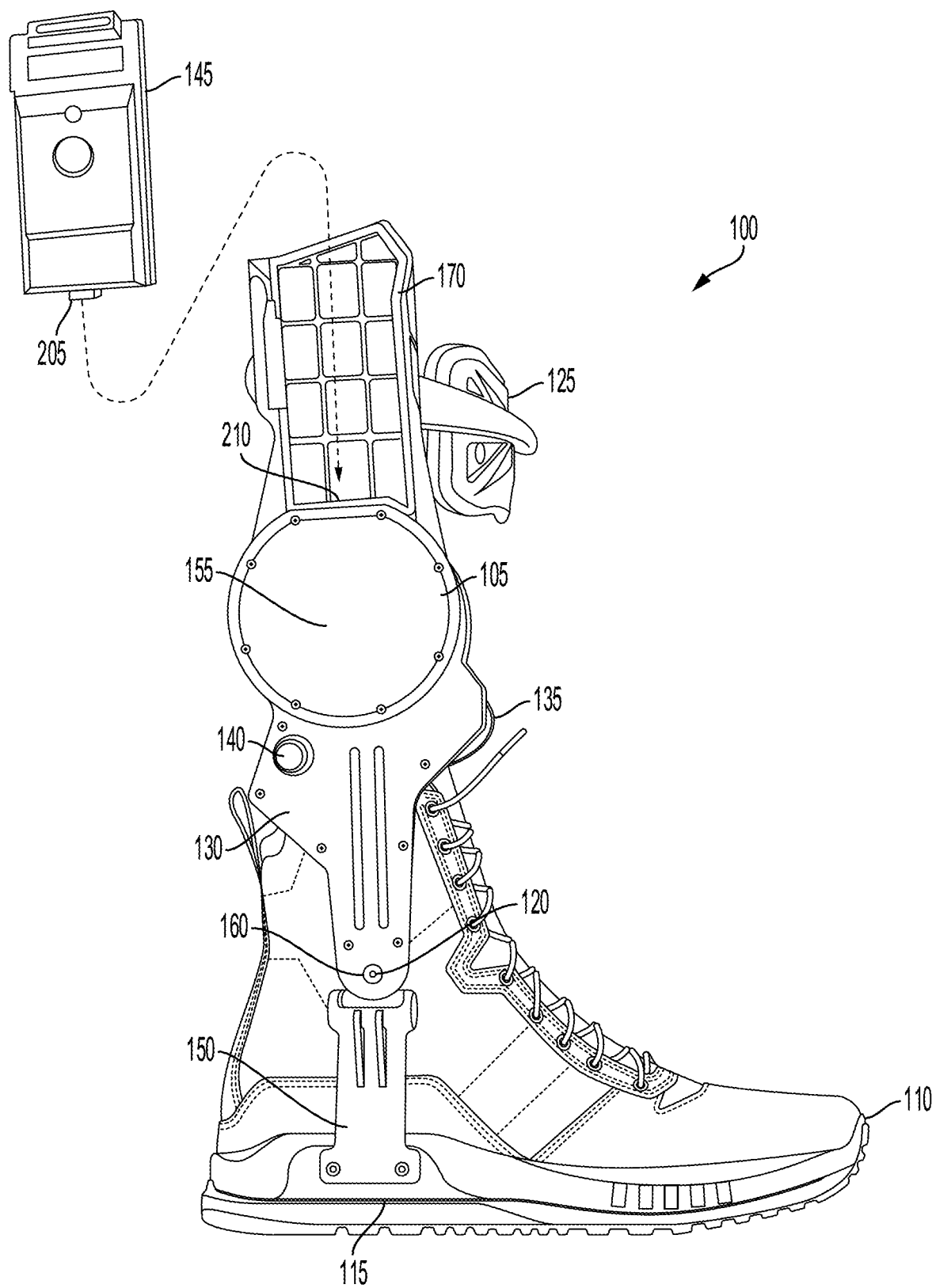
FIG. 2 illustrates a schematic diagram of an exoskeleton, according to an embodiment.

FIG. 2 illustrates a schematic diagram of the exoskeleton 100. The exoskeleton 100 includes the one or more housings 105, the boot 110 the footplate 115, the ankle joint component 120, shin pad 125, the actuator 130, the actuator belt 135, the power button 140, the battery module 145, the post 150, the rotary encoder 155, and the second rotary encoder 160. The battery module 145 can be inserted into the exoskeleton 100. The battery module 145 can include a sealed battery. The battery module 145 can coupled with the exoskeleton 100 via a waterproof or water resistant connection. The battery module 145 can connect locally (e.g., proximate) to the exoskeleton 100 such that a wire is not needed to run from the battery module 145 to the electronics.

The battery module 145 can be removably affixed to the battery holder 170. For example, the battery module 145 can slide in and out of the battery holder 170. By removably affixing the battery module 145 to the battery holder 170, the battery module 145 can be replaced with another battery module 145, or the battery module 145 can be removed for charging. The battery module 145 can include a first power connector 205 that electrically couples to a second power connector 210 located in the battery holder 170 while attached to the battery holder 170 to provide electric power to the electronic circuitry and the electric motor. The first power connector 205 and the second power connector 210 can couple (e.g., connect) the battery module 145 with the electronic circuitry. The first power connector 205 and the second power connector 210 can couple the battery module 145 with the one or more housings 105. The first power connector 205 can be recessed in the battery module 145 to protect the first power connector 205 from loading and impacts. The first power connector 205 and the second power connector 210 can include wires (e.g., two wires, three wires, or four wires). The battery module 145 can communicate with the electronic circuitry via the first power connector 205 and the second power connector 210. The first power connector 205 and the second power connector 210 can include an exposed connector.

The geometry of the battery module 145 can allow for storage and packing efficiency. The battery module 145 can include a gripping element to allow for ergonomic ease of removal and insertion of the battery module 145 into the battery holder 170. The battery module 145 can be made of lightweight plastics or metals. The battery module 145 can be made of heat insulating materials to prevent heat generated by the battery cells 305 from reaching the user. One or more faces of the battery module 145 can be made of metal to dissipate heat.

The exoskeleton 100 can communicate with the battery module 145 during operation. The exoskeleton 100 can use battery management system information to determine when safety measures will trigger. For example, during a high current peak (e.g., 15 A) or when the temperature is near a threshold, the power output can be turned off. The exoskeleton 100 can temporarily increase safety limits for very specific use cases (e.g., specific environmental conditions, battery life). The battery module 145 can prevent the exoskeleton 100 from shutting down by going into a low power mode and conserving power. The exoskeleton 100 can put the battery module 145 in ship mode if a major error is detected and the exoskeleton 100 wants to prevent the user from power cycling. The battery management system 324 can be adapted to support more or less series cells, parallel cells, larger capacity cells, cylindrical cells, different lithium chemistries, etc.

Figure 3:
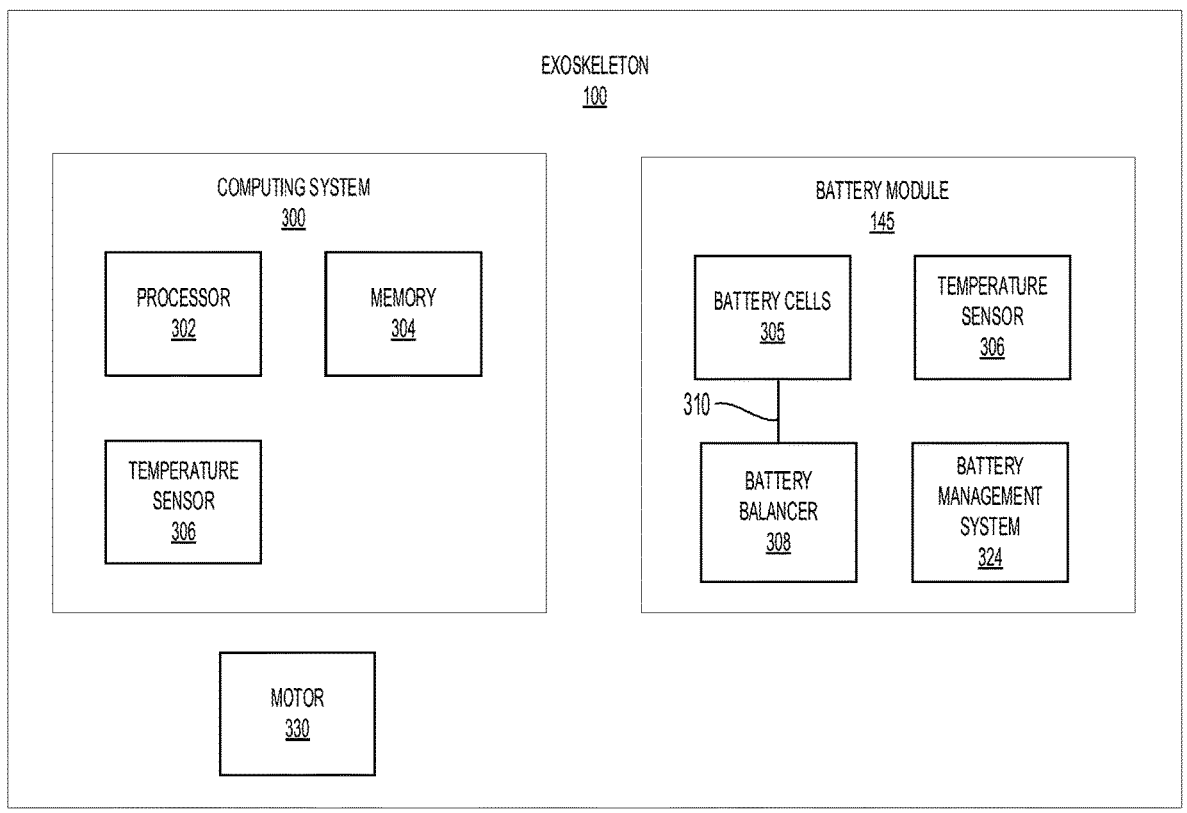
FIG. 3 illustrates a schematic diagram of an exoskeleton, according to an embodiment.

FIG. 3 illustrates a schematic diagram of an exoskeleton 100. The exoskeleton 100 can include a motor 330. The motor 330 can generate torque about an axis of rotation of an ankle joint of the user. The exoskeleton 100 can include the battery module 145. The exoskeleton 100 can include a computing system 300. The exoskeleton 100 can include one or more processors 302, memory 304, and one or more temperature sensors 306 (e.g., thermocouples). The one or more processors 302, memory 304, and one or more temperature sensor 306 can be located within the computing system 300. In some cases, the computing system 300 can include the batter balancer 308 as opposed to the battery module 145.

The one or more processors 302 can receive data corresponding to a performance of the battery module 145. The data can include one or more of a temperature, current, voltage, battery percentage, internal state or firmware version. The one or more processors 302 can determine, based on a safety policy, to trigger a safety action. The safety policy can include triggering the safety action if a threshold temperature, voltage or battery percentage is crossed. For example, the safety policy can include triggering the safety action if a temperature of one or more of the plurality of battery cells 305 is higher than a threshold temperature. The safety policy can include triggering the safety action if a battery percentage of the battery module 145 is below a threshold battery percentage. The safety policy can include triggering the safety action if a measured temperature is higher than the threshold temperature. The measured temperature can include the temperature of the printed circuit board and battery cells 305. The measured temperature can include the temperature of the printed circuit board and battery cells 305 measured in two locations. The safety policy can include triggering the safety action if a measured voltage is higher than the threshold voltage.

The one or more processors 302 can instruct, based on the safety action, the electronic circuitry to adjust delivery of power from the battery module 145 to the electric motor to reduce an amount of torque generated about the axis of rotation of the ankle joint of the user. The safety action can include lowering or reducing the amount of torque generated about the axis of rotation of the ankle joint of the user. The safety action can include increasing the amount of torque generated about the axis of rotation of the ankle joint of the user.

The one or more temperature sensors 306 can be placed between the plurality of battery cells 305 to provide an indication of a temperature between the plurality of battery cells 305. A temperature sensor of the one or more temperature sensors 306 can be mounted on the printed circuit board to measure a temperature of the printed circuit board. The electronic circuitry 505 can control the delivery of power from the battery module 145 to the electric motor based at least in part on the indication of the temperature between the plurality of battery cells 305 or the temperature of the printed circuit board.

The one or more battery balancers 308 can be configured to actively transfer energy from a first battery cell 305 of the plurality of battery cells 305 to a second battery cell 305 of the plurality of battery cells 305 having less charge than the first battery cell 305. A signal trace 310 can electrically connect the plurality of battery cells 305 to the one or more battery balancers 308. The signal trace 310 can be located on the printed circuit board.

The exoskeleton 100 can include the battery module 145. The battery module 145 can include a plurality of battery cells 305, one or more temperature sensors 306, one or more battery balancers 308, and a battery management system 324. The battery management system 324 can perform various operations. For example, the battery management system 324 can optimize the energy density of the unit, optimize the longevity of the cells 305, and enforce the required safety to protect the user. The battery management system 324 can go into ship mode by electrically disconnecting the battery module 145 from the rest of the system to minimize power drain while the system is idle. The battery management system 324 can go into ship mode if a major fault is detected. For example, if one or more of the plurality of battery cells 305 self-discharge at a rate higher than a threshold, the battery management system 324 can re-enable the charging port.

While these components are shown as part of the exoskeleton 100, they can be located in other locations such as external to the exoskeleton 100. For example, the battery management system 324 or the computing system 300 can be located external to the exoskeleton 100 for testing purposes.

Figure 4:
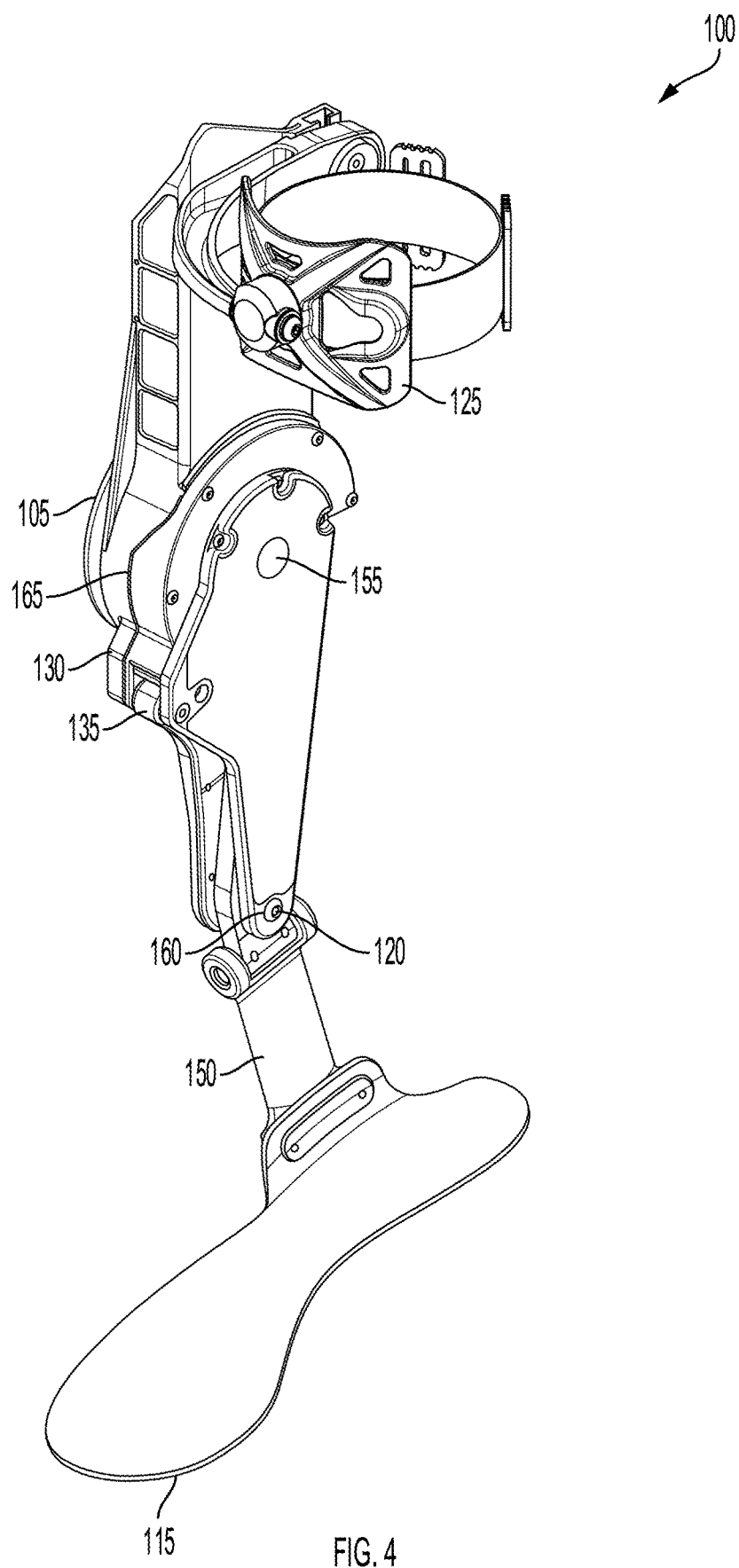
FIG. 4 illustrates a schematic diagram of an exoskeleton, according to an embodiment.

FIG. 4 illustrates a schematic diagram of the exoskeleton 100. The exoskeleton 100 can include the one or more housings 105, the footplate 115, the ankle joint component 120, shin pad 125, the actuator 130, the actuator belt 135, the post 150, the rotary encoder 155, the second rotary encoder 160, and the sealant 165 as described above. The one or more housings 105 can be coupled to the shin pad 125. The post 150 can couple the ankle joint component 120 with the footplate 115. The actuator 130 can include the one or more housings 105, the footplate 115, the ankle joint component 120, the actuator belt 135, and the post 150. The rotary encoder 155 can measure an angle of the electric motor. The second rotary encoder 160 can measure an angle of the ankle joint. The sealant 165 can be placed in contact with the one or more housings 105 to close the one or more housings 105 and prevent an ingress of water into the one or more housings 105.

Figure 5:
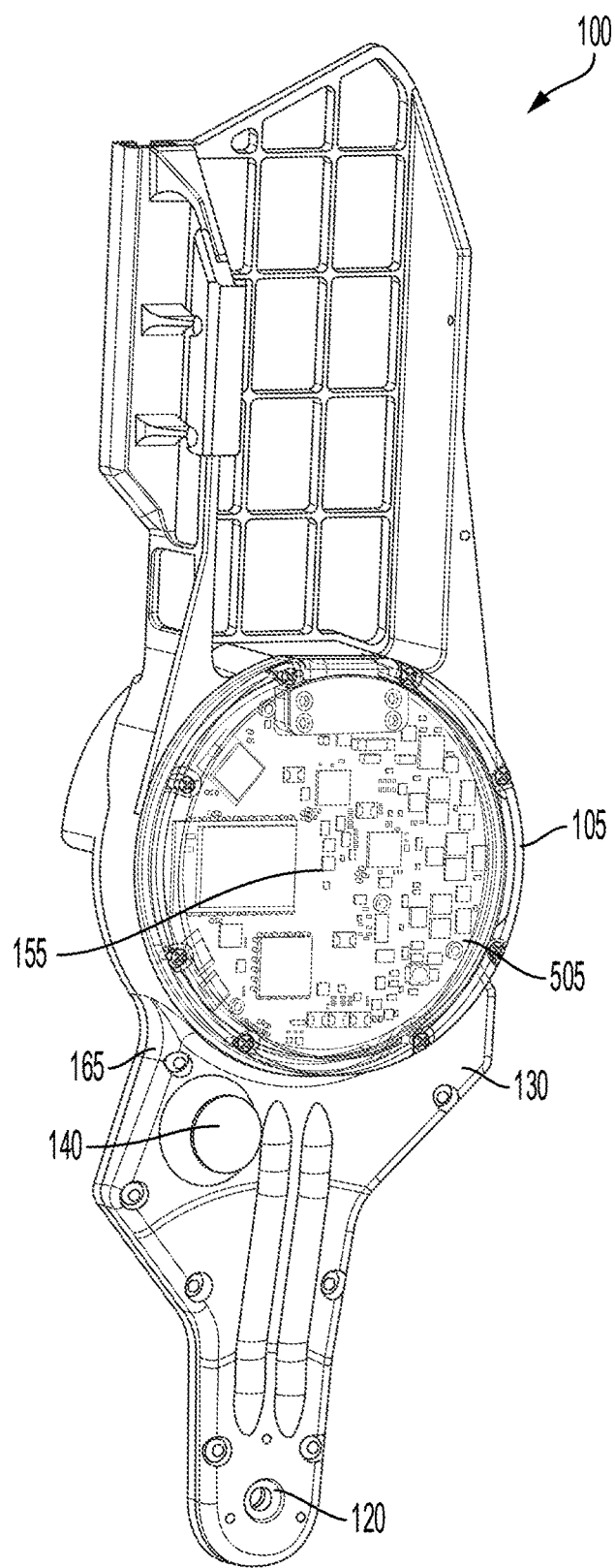
FIG. 5 illustrates a schematic diagram of the exoskeleton and internal parts, according to an embodiment.

FIG. 5 illustrates a schematic diagram of the exoskeleton 100 and internal parts. The exoskeleton 100 can include the one or more housings 105, the ankle joint component 120, the actuator 130, the power button 140, the rotary encoder 155, the second rotary encoder 160, and the sealant 165 as described above. The internal parts can include electronic circuitry 505 (e.g., electronic circuit, circuitry, electronics). The electronic circuitry 505 can include individual electronic components (e.g., resistors, transistors, capacitors, inductors, diodes, processors, or controllers). The power button 140 can be electrically connected to the electronic circuitry 505. The electronic circuitry 505 can be located behind the electric motor. The electronic circuitry 505 can include the main electronics board. The rotary encoder 155 can be located between the motor and electronic circuitry 505. The electronic circuitry 505 can control delivery of power from the battery module 145 to the electric motor to generate torque about the axis of rotation of the ankle joint of the user.

Figure 6:
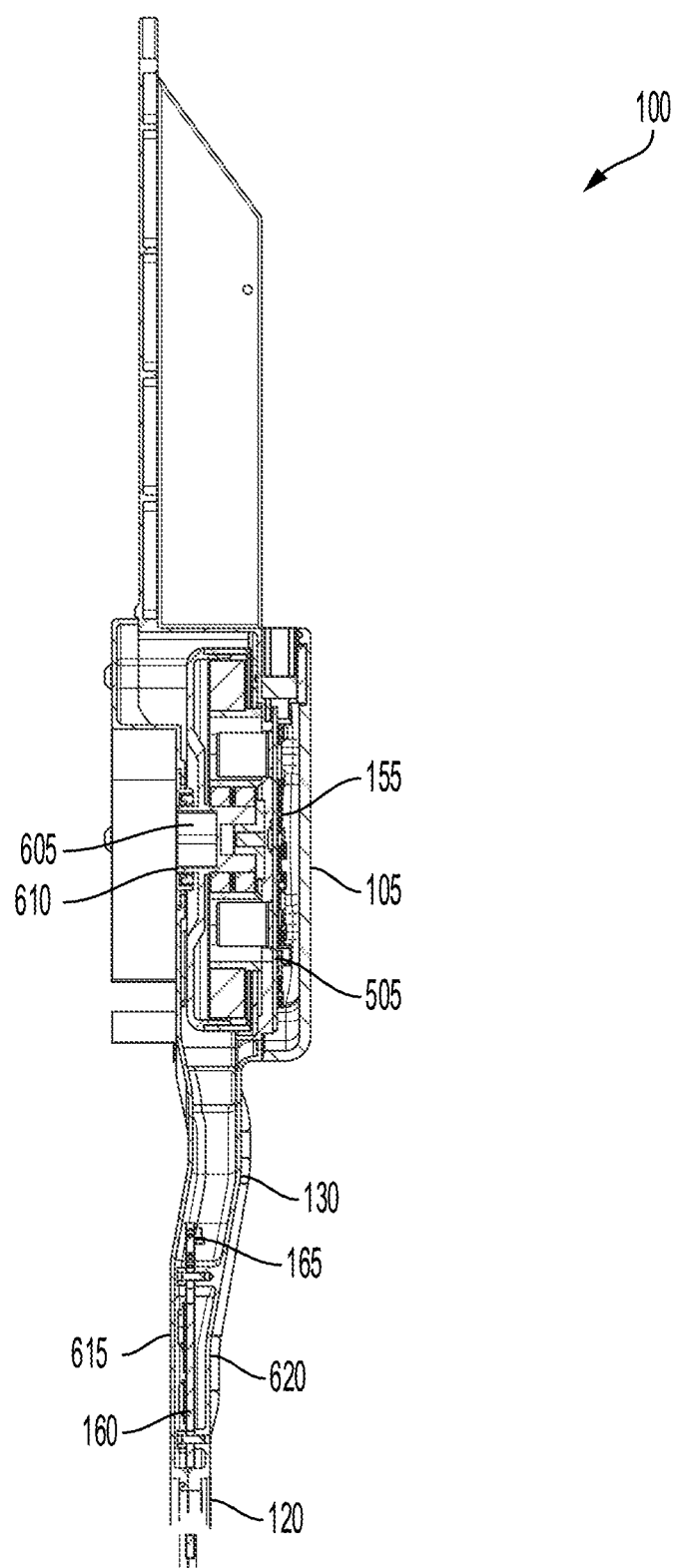
FIG. 6 illustrates a side view of an exoskeleton, according to an embodiment.

FIG. 6 illustrates a side view of the exoskeleton 100. The exoskeleton 100 can include the one or more housings 105, ankle joint component 120, the actuator 130, the rotary encoder 155, the second rotary encoder 160, the sealant 165, and electronic circuitry 505 as described above. The exoskeleton 100 can include an output shaft 605 (e.g., motor rotor, spool shaft, pinion gear, spur gear, or toothed pulley). The output shaft 605 can be coupled to the electric motor. The output shaft 605 can extend through a bore 610 in a housing of the one or more housings 105 enclosing the electric motor. The bore 610 can receive the output shaft 605. An encoder chip can be located on the electronics board on a first side of the electric motor. The encoder chip can measure the angular position of the rotary encoder 155. The exoskeleton 100 can include a transmission (e.g., gearbox) configured to couple the output shaft 605 to the electric motor. The transmission can include a machine in a power transmission system. The transmission can provide controlled application of power. The output shaft 605 can be integrated into the motor rotor. The output shaft 605 can be part of a mechanism (e.g., gears, belts, linkage, or change). An ankle shaft can extend through the second rotary encoder 160 which can increase the structural integrity of the exoskeleton 100.

The exoskeleton 100 can include a first component of the fitted structure 615 (e.g., first clamshell structure). The exoskeleton 100 can include a second component of the fitted structure 620 (e.g., second clamshell structure). The first component of the fitted structure 615 can be coupled with the second component of the fitted structure 620. The first component of the fitted structure 615 can be attached to the second component of the fitted structure 620 via the sealant 165 (e.g., adhesive sealant). The first component of the fitted structure 615 can be coupled to the second component of the fitted structure 620 such that the fitting prevents or decreases a rate of water flow into the interior of the exoskeleton 100. The fitted structure can include two or more components such that the assembly components prevents or decreases a rate of water flow into the interior of the exoskeleton 100. The first component of the fitted structure 615 and the second component of the fitted structure 620 can be stationary components. The number of individual components of the fitted structure can be minimized to decrease the number of possible entry points for water to enter the exoskeleton 100. The possible entry points can include seams and/or moving parts of the exoskeleton 100. The seams can be permanently sealed via the sealant 165.

An adhesive sealant (e.g., super glue, epoxy resin, or polyvinyl acetate) can be placed between the first component of the fitted structure 615 and the second component of the fitted structure 620. The adhesive sealant can prevent or decrease the rate of water flow through the seam between the first component of the fitted structure 615 and the second component of the fitted structure 620 into the interior of the exoskeleton 100. The adhesive sealant can be placed under the electronics cover. The adhesive sealant can prevent or decrease the rate of water flow through the seam between the electronics cover and the exoskeleton one or more housings 105 into the interior of the exoskeleton 100.

A gasket can be placed between the first component of the fitted structure 615 and the second component of the fitted structure 620. The gasket can be placed in the seam between the first component of the fitted structure 615 and the second component of the fitted structure 620. The gasket can prevent or decrease the rate of water flow through the seam between the first component of the fitted structure 615 and the second component of the fitted structure 620.

Figure 7:
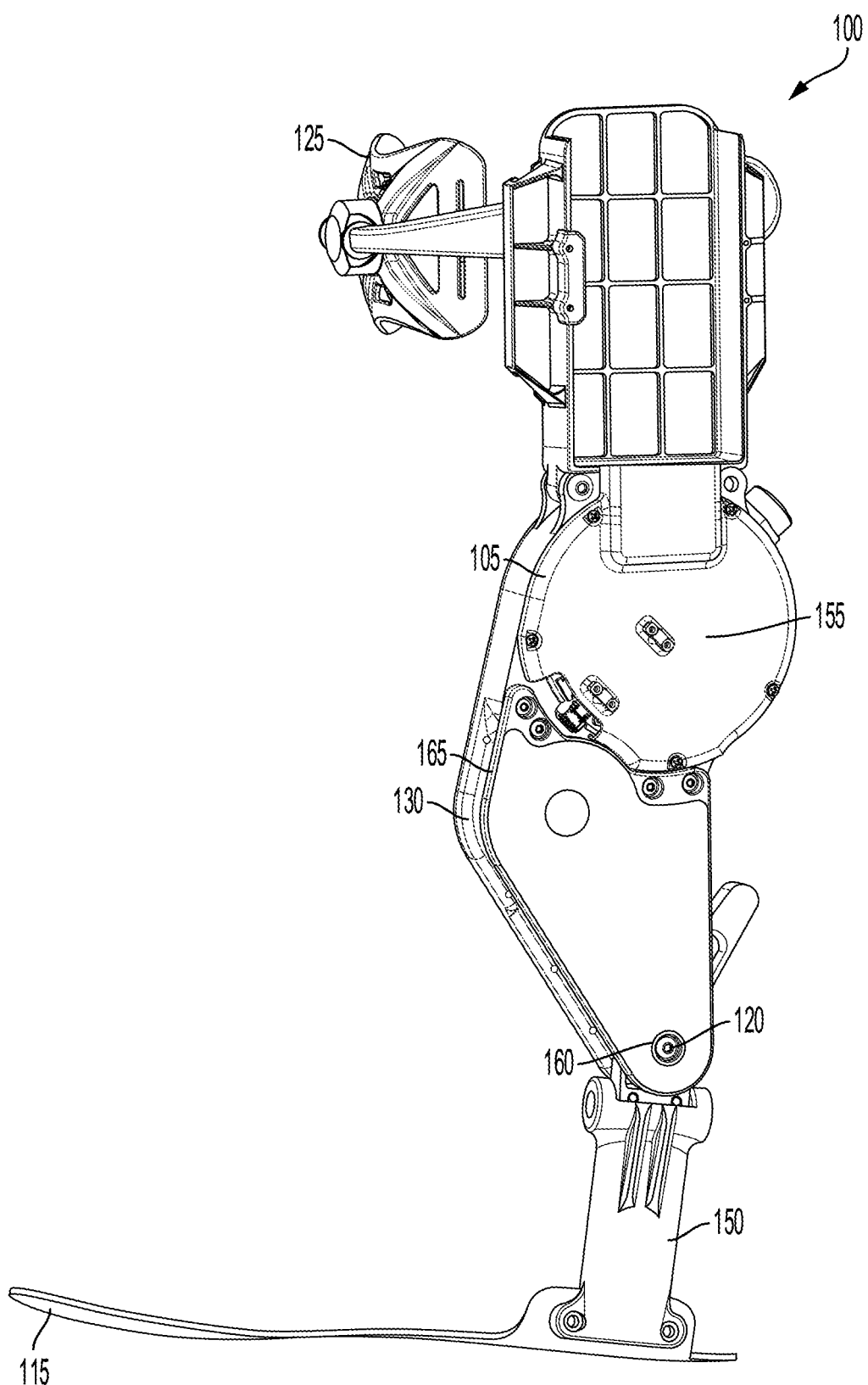
FIG. 7 illustrates a schematic diagram of an exoskeleton, according to an embodiment.

FIG. 7 illustrates a schematic diagram of the exoskeleton 100. The exoskeleton 100 can include the one or more housings 105, the footplate 115, the ankle joint component 120, the shin pad 125, the actuator 130, the post 150, the rotary encoder 155, the second rotary encoder 160, and the sealant 165 as described above. The one or more housings 105 can be coupled to the shin pad 125. The post 150 can couple the ankle joint component 120 with the footplate 115. The actuator 130 can include the one or more housings 105, the footplate 115, the ankle joint component 120, and the post 150. The rotary encoder 155 can measure an angle of the electric motor. The second rotary encoder 160 can measure an angle of the ankle joint.

Figure 8:
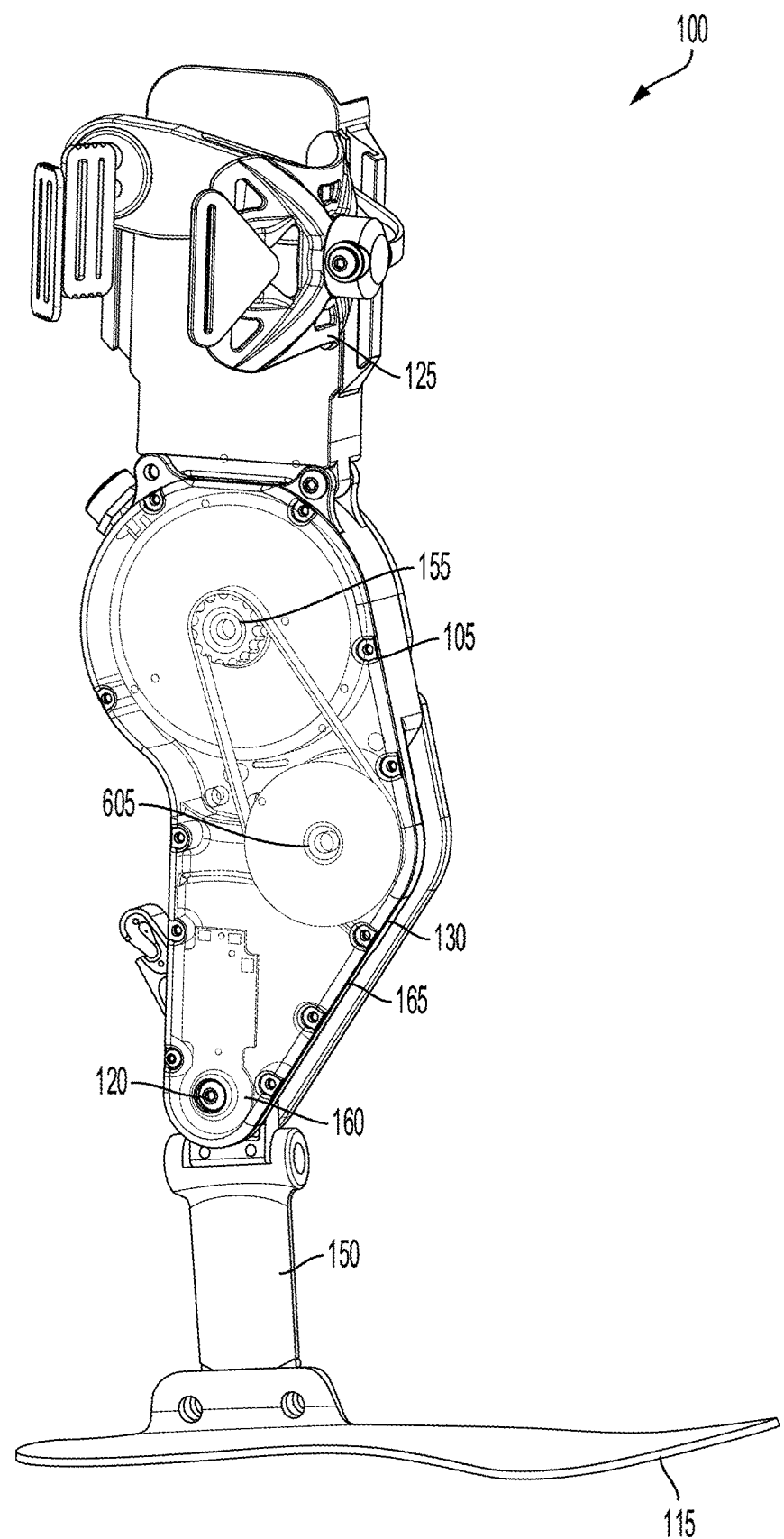
FIG. 8 illustrates a schematic diagram of an exoskeleton and internal parts, according to an embodiment.
Figure 9:
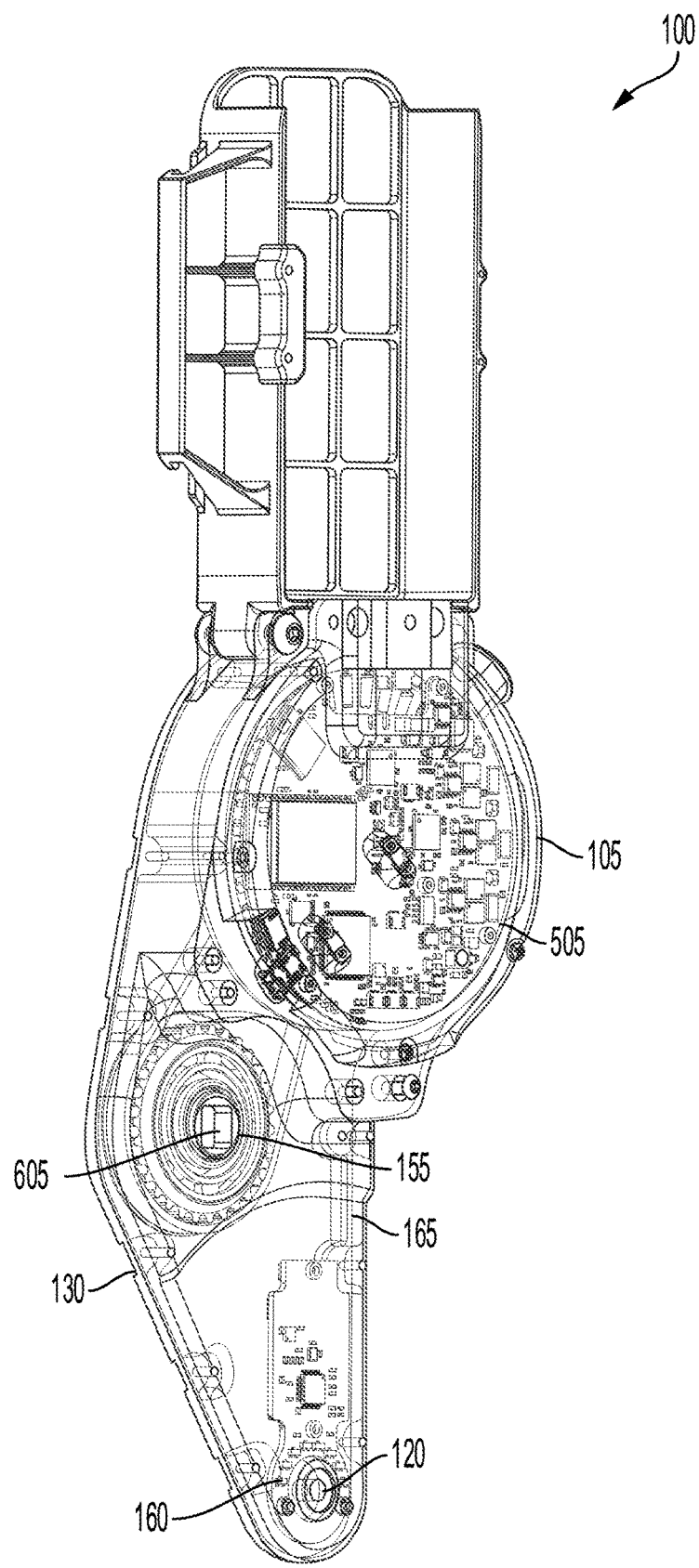
FIG. 9 illustrates a schematic diagram of an exoskeleton and internal parts, according to an embodiment.

FIG. 8 and FIG. 9 illustrate schematic diagrams of the exoskeleton 100 and internal parts. The exoskeleton 100 can include the one or more housings 105, the footplate 115, the ankle joint component 120, shin pad 125, the actuator 130, the post 150, the rotary encoder 155, the second rotary encoder 160, the sealant 165, and electronic circuitry 505 as described above. The internal parts can include an electronic circuit (e.g., circuitry). The electronic circuit can include individual electronic components (e.g., resistors, transistors, capacitors, inductors, diodes, processors, or controllers). The motor rotor can be connected to the output shaft 605.

Figure 10:
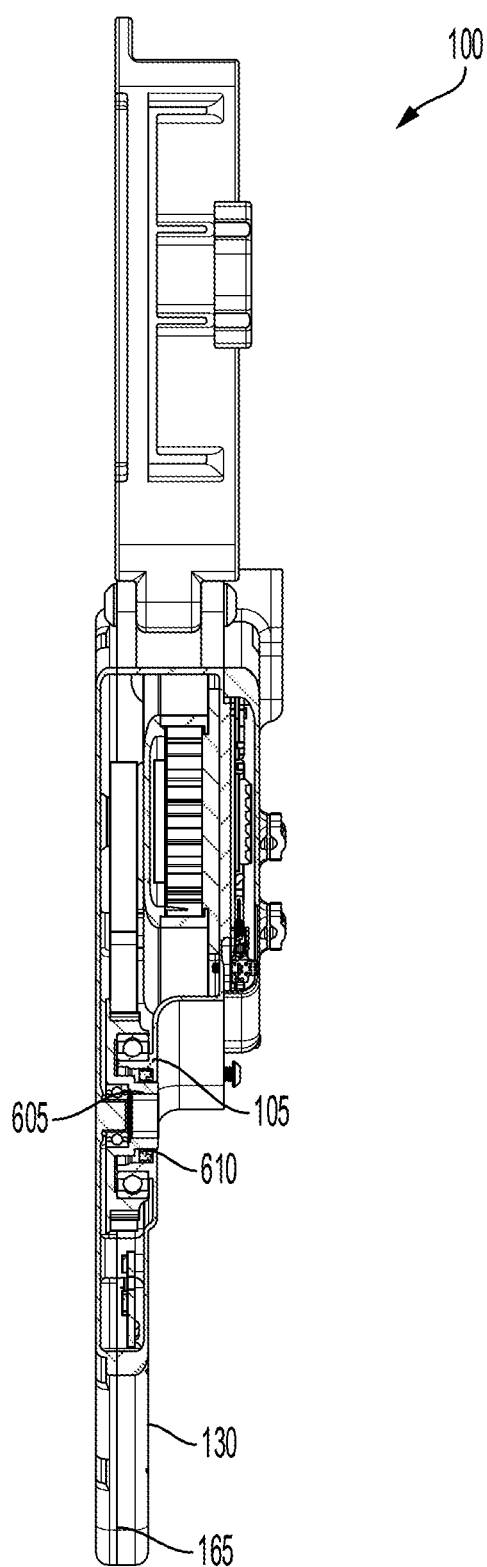
FIG. 10 illustrates a side view of an exoskeleton, according to an embodiment.

FIG. 10 illustrates a side view of the exoskeleton 100. The exoskeleton 100 can include the one or more housings 105, the actuator 130, the rotary encoder 155, the second rotary encoder 160, and the sealant 165, the output shaft 605, and the bore 610 as described above. The exoskeleton 100 can include an output shaft 605 (e.g., motor rotor). The output shaft 605 can be coupled to the electric motor. The output shaft 605 can extend through a bore 610 in a housing of the one or more housings 105 enclosing the electric motor. The bore 610 can receive the output shaft 605. A magnet can be located on a first side of the electric motor. An encoder chip can be located on the electronics board on the first side of the electric motor. The encoder chip can measure the angular position of the rotary encoder 155. An ankle shaft can extend through the second rotary encoder 160 which can increase the structural integrity of the exoskeleton 100. The exoskeleton 100 can include a transmission (e.g., gearbox) configured to couple the output shaft 605 to the electric motor. The transmission can include a machine in a power transmission system. The transmission can provide controlled application of power.

Figure 11:
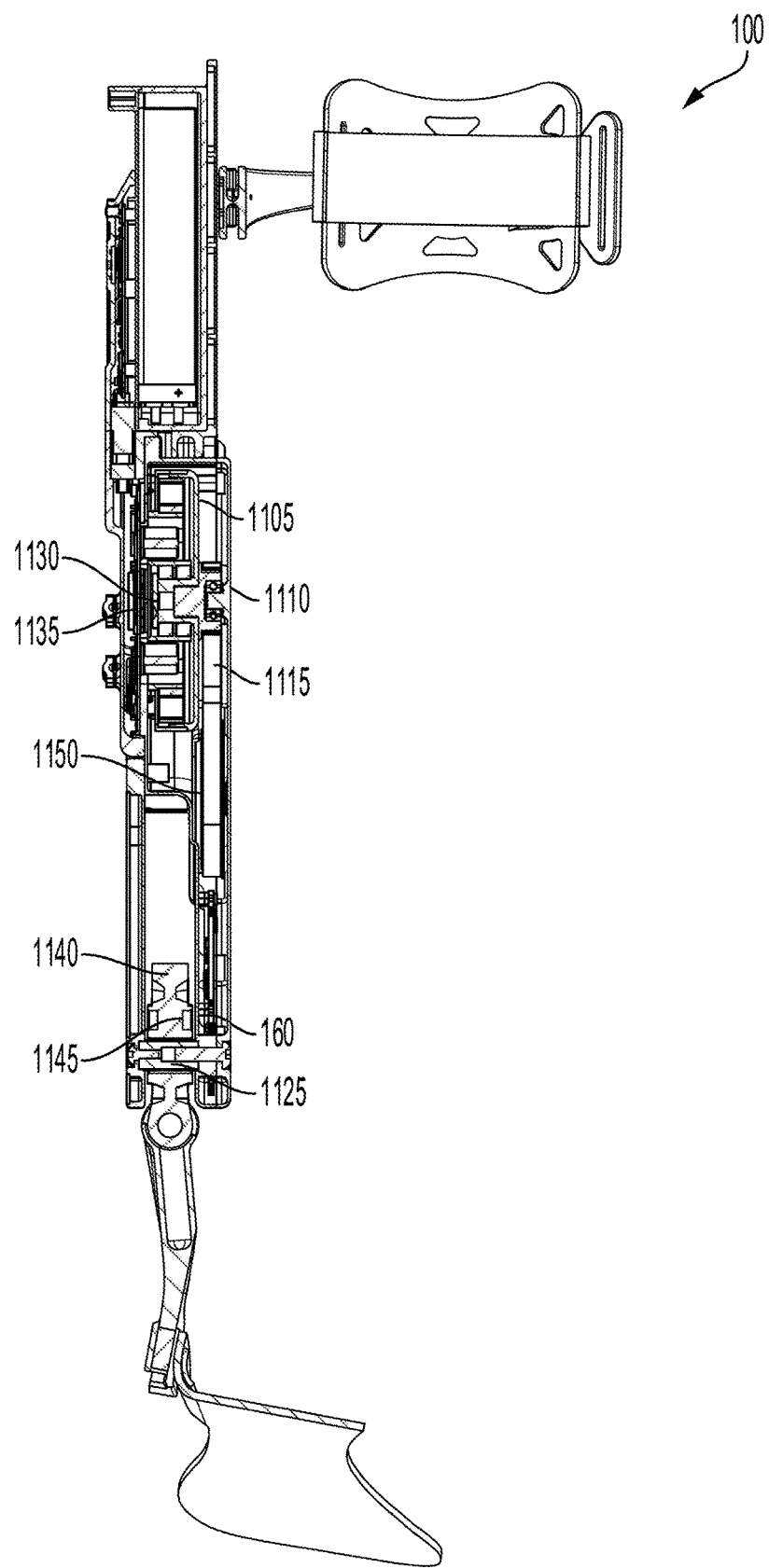
FIG. 11 illustrates a side view of an exoskeleton, according to an embodiment.

FIG. 11 illustrates a side view of an exoskeleton 100. The exoskeleton 100 can include a motor 1105 (e.g., electric motor), a motor timing pulley 1110 (e.g., timing pulley), a motor timing belt 1115 (e.g., timing belt), the second rotary encoder 160 (e.g., an ankle encoder PCB, ankle encoder printed circuit board, second rotary encoder PCB, or ankle encoder), an ankle shaft 1125, a motor encoder magnet 1130, a motor encoder 1135, a lever arm 1140 (e.g., ankle lever), and an ankle encoder magnet 1145. The ankle shaft 1125 can extend through the second rotary encoder 160 to increase the structural integrity of the exoskeleton 100. The motor timing belt 1115 can be coupled to a sprocket 1150. The sprocket 1150 can be coupled with a spool. The motor encoder magnet 1130 can be located on the first side of the electric motor.

Figure 12:
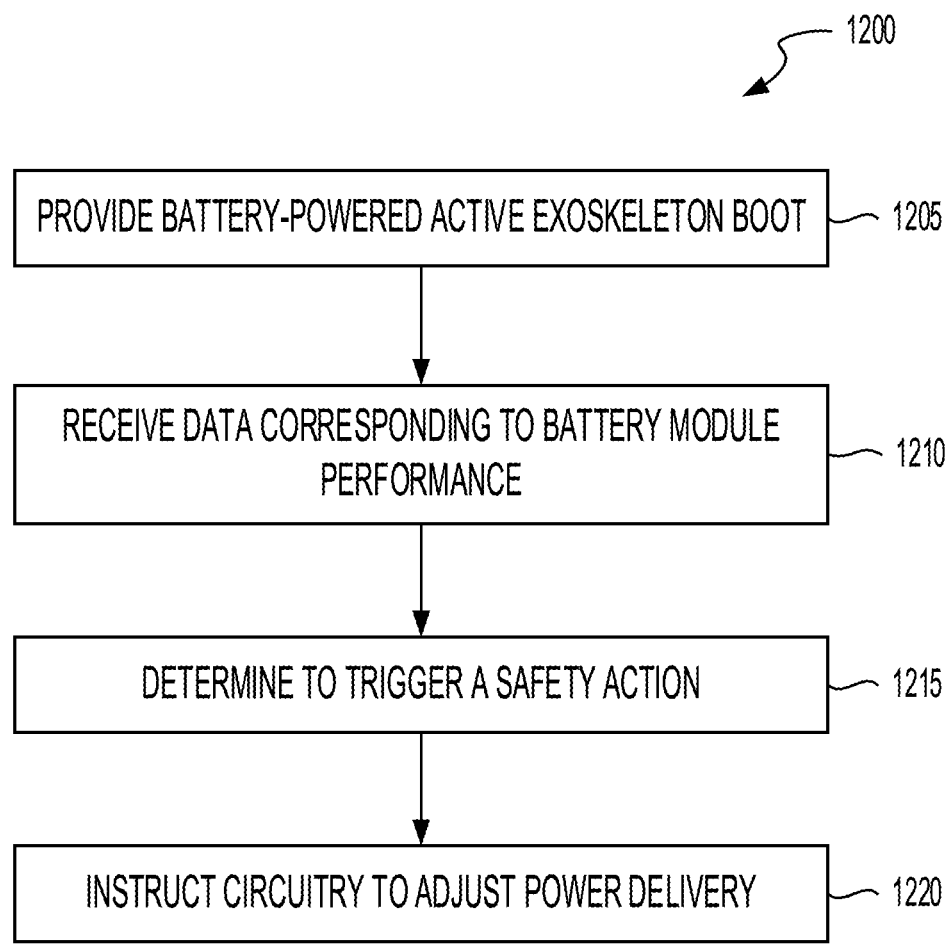
FIG. 12 illustrates a method of augmenting user motion, according to an embodiment.

FIG. 12 illustrates a method 1200 of augmenting user motion. The method 1200 can include providing, to a user, a battery-powered active exoskeleton boot (BLOCK 1205). The battery-powered active exoskeleton boot can include a shin pad to be coupled to a shin of a user below a knee of the user. The battery-powered active exoskeleton boot can include one or more housings enclosing electronic circuitry and an electric motor that can generate torque about an axis of rotation of an ankle joint of the user. At least one of the one or more housings can be coupled to the shin pad below the knee of the user. The battery-powered active exoskeleton boot can include a battery holder coupled to the shin pad. The battery holder can be located below the knee of the user and above the one or more housings enclosing the electronic circuitry. The battery-powered active exoskeleton boot can include a battery module removably affixed to the battery holder. The battery module can include a first power connector that electrically couples to a second power connector located in the battery holder while attached to the battery holder to provide electric power to the electronic circuitry and the electric motor. The battery-powered active exoskeleton boot can include an output shaft coupled to the electric motor and extending through a bore in a housing of the one or more housings enclosing the electric motor. The electronic circuitry can control delivery of power from the battery module to the electric motor to generate torque about the axis of rotation of the ankle joint of the user.

In some embodiments, the first power connector includes a blade connector. The second power connector can include a receptacle configured to receive the blade connector absent an exposed cable. The battery module can include a plurality of battery cells 305. The battery module can include a printed circuit board soldered to the plurality of battery cells 305. The battery module can include one or more battery balancers configured to actively transfer energy from a first battery cell 305 of the plurality of battery cells 305 to a second battery cell 305 of the plurality of battery cells 305 having less charge than the first battery cell 305. The battery module can include a signal trace, on the printed circuit board, that electrically connects the plurality of battery cells 305 to the one or more battery balancers.

In some embodiments, the method 1200 includes providing, via a serial data communication port of the first power connector, at least one of battery state data, a battery test function, a smart charging function, or a firmware upgrade. The battery state data can include the health of the battery module. The battery test function can include probing the battery module. The smart charging function can include using a high voltage to charge the battery module. A pin of the first power connector that provides serial data can be further configured to receive a voltage input greater than or equal to a threshold to wake up a battery management system of the battery module.

The method 1200 can include receiving data corresponding to battery module performance (BLOCK 1210). For example, the method 1200 can include receiving, by one or more processors of the battery-powered active exoskeleton boot, data corresponding to a performance of the battery module, the data comprising one or more of a temperature, current, voltage, battery percentage. For example, the data can include a temperature from one or more temperature sensors of the computing system. The data can include a temperature from one or more temperature sensors of the battery module.

The method 1200 can include determining to trigger a safety action (BLOCK 1215). For example, the method 1200 can include determining, by the one or more processors, based on a safety policy, to trigger a safety action. The safety policy can include triggering the safety action if a threshold temperature, voltage or battery percentage is crossed. For example, the safety policy can include triggering the safety action if a temperature of one or more of the plurality of battery cells 305 is higher than a threshold temperature. The safety policy can include triggering the safety action if a battery percentage of the battery module is below a threshold battery percentage. The measured temperature can include the temperature of the printed circuit board and battery cells 305. The measured temperature can include the temperature of the printed circuit board and battery cells 305 measured in two locations. The safety policy can include triggering the safety action if a measured voltage is higher than the threshold voltage.

The method 1200 can include instructing circuitry to adjust power delivery (BLOCK 1220). For example, the method 1200 can include instructing, by the one or more processors, based on the safety action, the electronic circuitry to adjust delivery of power from the battery module to the electric motor to reduce an amount of torque generated about the axis of rotation of the ankle joint of the user. The safety action can include lowering or reducing the amount of torque generated about the axis of rotation of the ankle joint of the user. The safety action can include increasing the amount of torque generated about the axis of rotation of the ankle joint of the user.

Figure 13:
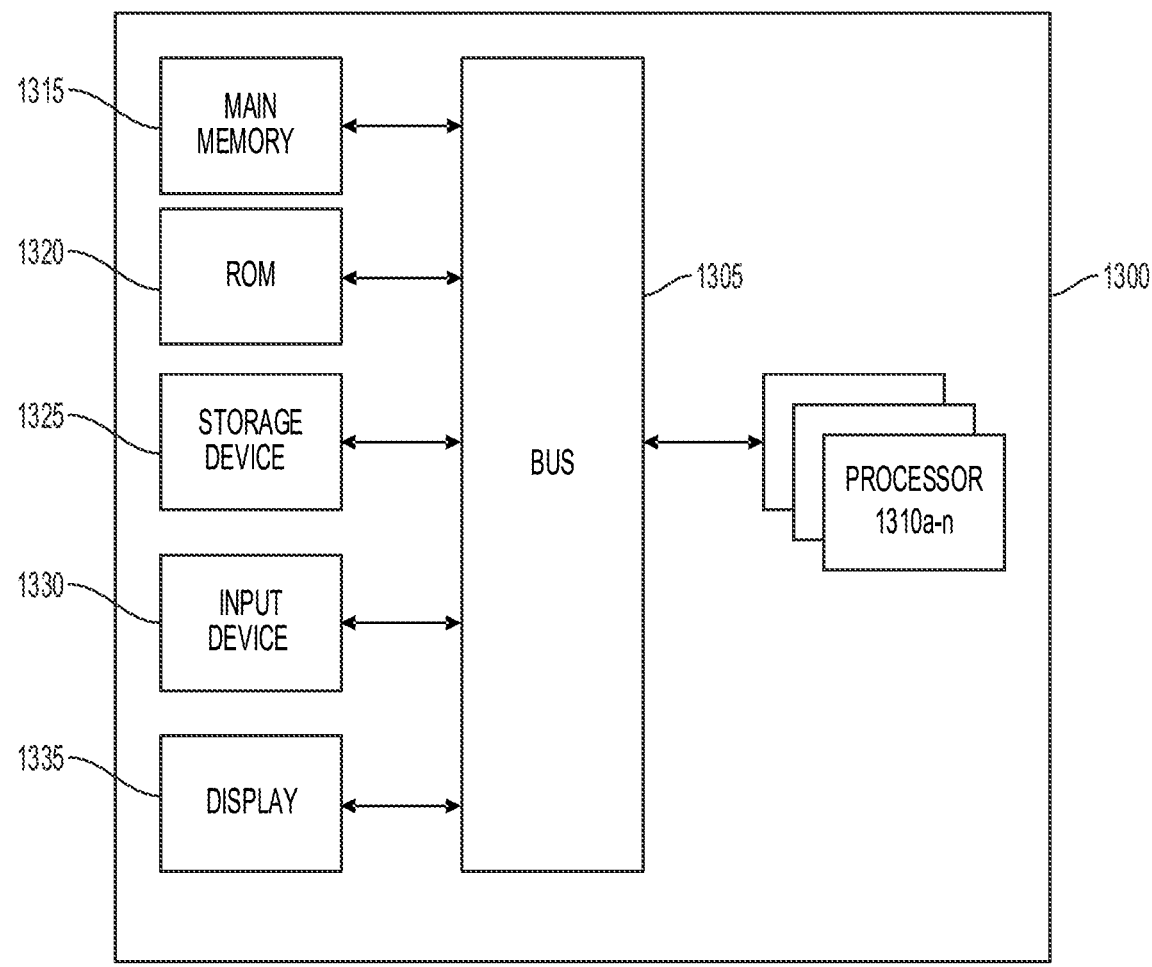
FIG. 13 illustrates a block diagram of an architecture for a computing system employed to implement various elements of the system and methods depicted in FIGS. 1-16, according to an embodiment.

FIG. 13 illustrates a block diagram of an architecture for a computing system employed to implement various elements of the system and methods depicted in FIGS. 1-16, according to an embodiment. FIG. 13 is a block diagram of a data processing system including a computer system 1300 in accordance with an embodiment. The computer system can include or execute a coherency filter component. The data processing system, computer system or computing device 1300 can be used to implement one or more components configured to process data or signals depicted in FIGS. 1-12 and 14-16. The computing system 1300 includes a bus 1305 or other communication component for communicating information and a processor 1310*a-n* or processing circuit coupled to the bus 1305 for processing information. The computing system 1300 can also include one or more processors 1310 or processing circuits coupled to the bus for processing information. The computing system 1300 also includes main memory 1315, such as a random access memory (RAM) or other dynamic storage device, coupled to the bus 1305 for storing information, and instructions to be executed by the processor 1310. Main memory 1315 can also be used for storing time gating function data, temporal windows, images, reports, executable code, temporary variables, or other intermediate information during execution of instructions by the processor 1310. The computing system 1300 may further include a read only memory (ROM) 1320 or other static storage device coupled to the bus 1305 for storing static information and instructions for the processor 1310. A storage device 1325, such as a solid state device, magnetic disk or optical disk, is coupled to the bus 1305 for persistently storing information and instructions.

The computing system 1300 may be coupled via the bus 1305 to a display 1335 or display device, such as a liquid crystal display, or active matrix display, for displaying information to a user. An input device 1330, such as a keyboard including alphanumeric and other keys, may be coupled to the bus 1305 for communicating information and command selections to the processor 1310. The input device 1330 can include a touch screen display 1335. The input device 1330 can also include a cursor control, such as a mouse, a trackball, or cursor direction keys, for communicating direction information and command selections to the processor 1310 and for controlling cursor movement on the display 1335.

The processes, systems and methods described herein can be implemented by the computing system 1300 in response to the processor 1310 executing an arrangement of instructions contained in main memory 1315. Such instructions can be read into main memory 1315 from another computer-readable medium, such as the storage device 1325. Execution of the arrangement of instructions contained in main memory 1315 causes the computing system 1300 to perform the illustrative processes described herein. One or more processors in a multi-processing arrangement may also be employed to execute the instructions contained in main memory 1315. In some embodiments, hard-wired circuitry may be used in place of or in combination with software instructions to effect illustrative implementations. Thus, embodiments are not limited to any specific combination of hardware circuitry and software.

Although an example computing system has been described in FIG. 13, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

III. Customized Configuration for an Exoskeleton Device

Systems, methods and devices of this technical solution are directed to a user application to provide customized configuration for a controller of an exoskeleton device. The augmentation provided by the exoskeleton to the user can be customized for the particular user based in part on feedback from the user and feedback from the exoskeleton itself. The exoskeleton device can provide a user application to the user through the exoskeleton device and/or a client device of the user to enable the user to provide feedback during operation of the exoskeleton and to customer control of the exoskeleton device. For example, the user can wear one or more exoskeleton devices (e.g., right leg, left leg) during different activities including, but not limited to, walking or running. The exoskeleton devices can provide force or torque to the respective limb to reduce an amount of force provided by the user to perform the movement and reduce a physiological impact on the user during the movement. As force and/or torque is transferred from the exoskeleton device to a limb of the user, a behavior of the user can be augmented and a behavior of the exoskeleton device can be modified based in part on the behavior and/or performance of the user during the movement. The user can provide characteristics indicative of how the user is performing during the movement and/or how the user is interacting with the exoskeleton device to the exoskeleton device through the user application. The feedback can include audio feedback, tactile feedback, and/or data entered through the device. The exoskeleton can generate new control parameters (e.g., force values, torque values) to provide the user for the current movement and/or one or more subsequent movements based in part on the received user characteristics. The exoskeleton can change or modify its behavior and output to the user to provide customized control unique to the user of the exoskeleton device during the current movement and/or one or more subsequent movements.

Mobility exoskeleton devices and medical devices can employ a one size fits all mentality and be targeted for particular use types and thus be generalized for a large population to take advantage of the mobility exoskeleton devices. For example, medical devices can be created for a specific treatment, therapy type and/or body part to treat a wide range of patients having the corresponding issue and thus not customizable to a particular user. Further, medical devices can remove or limit user control to over operation and device parameters. Medical devices such as braces or prosthetics are intended to provide a determined level of stiffness and eliminate or severely limit the ability of the user to change or modify the function of the device.

The exoskeleton devices described herein can include a user application that enables customization for an individual user to optimize collaboration between the user and the exoskeleton and increase an individual performance of the user preforming different movements and activities while wearing the exoskeleton. The user can provide characteristics and feedback through the user application to the exoskeleton for the exoskeleton to make informed determinations for appropriate levels of force and/or torque to provide to the particular user. The exoskeleton can customize the movement augmentation provided the user based in part on changing users needs, environmental conditions and/or changes to the exoskeleton system. In some embodiments, the exoskeleton can customize the movement augmentation provided the user based in part on characteristics or outputs of similar users to enable group level optimization. For example, the exoskeleton can determine appropriate levels of force and/or torque to provide to the particular user based in part on the needs of the user and a group of users that that the respective user is included within (e.g., military team, sports team). As users change or modify their behavior using the exoskeleton device (e.g., device augmentation), the exoskeleton device can continually update and modify its behavior to provide customized control of the exoskeleton device and operation of the exoskeleton device.

The user application can be provided to the user through a client application executing on a client device of the user. For example, in some embodiments, the user application can be a mobile application for the user to provide characteristics to the exoskeleton device. Characteristics can include, but not limited to, personal characteristics (e.g., age, weight, height), an activity level of the user (e.g., sedentary, light, moderate, active), a type of activity (e.g., walking, running, hiking, medical), user experience level with the exoskeleton device (e.g., new user, experienced user), and/or a level of augmentation. The user can customize setting of the exoskeleton device for a particular activity, including, a distance of the activity, a desired battery life or battery needs for the activity and batter modes (e.g., power save mode, normal power mode). The user can connect and sync different sensors, for example, from different devices to the exoskeleton system (e.g., watch sensors, foot pod, heart rate sensor).

The characteristic of the intended activity can be provided to the exoskeleton device through the user application including a starting point and end point of an intended route, total distance and/or estimated time for the activity.

The exoskeleton device can customize the augmentation for the user based in part on the provided characteristics. The exoskeleton device can determine characteristics of the intended activity and route, including but not limited to, terrain, altitude, and battery requirements. Using the user provided characteristics and the device determined characteristics, the exoskeleton device can determine a percentage or amount of the battery power the intended activity and route will take and present this information to the user through the user application. The exoskeleton device can provide feedback to the user through the user application, including but not limited to, battery power, missed step flags (e.g., user missed step, device behaved in undesirable manner).

The user application can provide various forms of controller customization including real-time controller input from the user, pre-determined controller inputs, user defined controls, and/or previously determined controls. The customization can include control parameters of the exoskeleton. For example, the user can request or enter a stiffness level for the exoskeleton and/or level of augmentation for the exoskeleton device to provide to the user. The user application can enable the user to provide timing criteria or actuation lag between or during movements and/or bilateral asymmetry settings for a respective movement. A transparency of the exoskeleton can be controlled by the user to select how sensitive the exoskeleton is to different events, such as gait transitions or transitions between different types of activities (e.g., walking to running).

Figure 14:
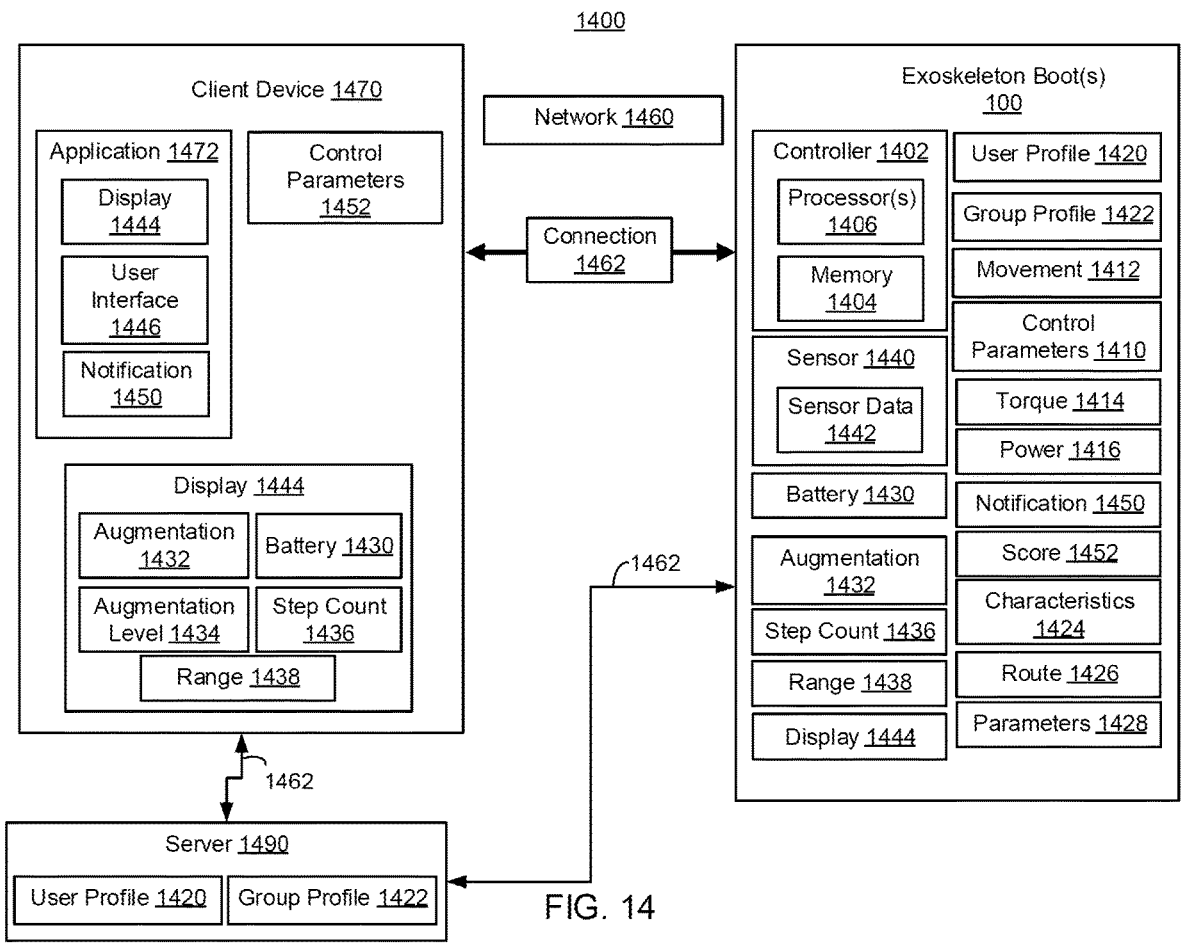
FIG. 14 is a block diagram of a system for a customized configuration for an exoskeleton controller in accordance with an illustrative embodiment.

Referring to FIG. 14, depicted is a block diagram of one embodiment of a system 1400 having an exoskeleton boot 100 and an application 1472 provided through a device 1470 (e.g., client device) to enable user feedback and provide a customized configuration for a controller 1402 of the exoskeleton boot 100. The exoskeleton boot 100 can be worn by a user, for example, with one exoskeleton boot 100 on each lower limb (e.g., right leg, left leg), to aid the user in performing movements 1412 and/or activities (e.g., walking, running, hiking). The exoskeleton boots 100 described herein can provide a feedback system through the application 1472 (e.g., user application) for a user to interact with an exoskeleton boot 100 to provide movement characteristics (e.g., limb movement, joint movement, measurements) of the user during a movement 1412 and enable the controller 1402 of the exoskeleton boot 100 to generate customized control parameters 1410 for future or subsequent movements 1421 performed by the user wearing the exoskeleton boot 100. The exoskeleton boot 100 can include a customized configuration for operating the respective exoskeleton boot 100, customized for the particular user.

The feedback system can include the application 1472 provided to the user through the exoskeleton boot 100 and/or a device 1470 (e.g., phone application, smartwatch application, computer application). The user can enter different characteristics and/or measurements (e.g., age, weight, height, activity level, type of activity) to customize the control of the exoskeleton boot 100 for the user. The feedback from the user can include, but is not limited to, audio feedback, tactile feedback, haptic feedback and/or text or data entered through the user application 1472. The exoskeleton boot 100 can generate control parameters 1410 based in part on the provided user performance characteristics and/or measurements. The exoskeleton boot 100 can update or modify control parameters 1401 (e.g., in real-time) during a current movement 1412 based in part on the provided user performance characteristics and/or measurements to improve a performance of the user during the movement 1412. The exoskeleton boot 100 can generate control parameters 1410 indicating a torque 1414 or power 1416 to provide to a respective limb of the user through the exoskeleton boot 100 to reduce an amount of force provided by the user to perform the movement 1412 and reduce a physiological impact on the user during the movement 1412. The exoskeleton boot 100 an augment or otherwise change a behavior of the user while performing different movements 1412. The exoskeleton boot 100 can provide notifications 1450 in the form of visual, haptic and/or audio feedback to the user to indicate if changes were made, what changes were made and/or indicate if the respective exoskeleton boot 100 is behaving appropriately during a current or active movement 1412. The exoskeleton boot 100 can modify or change its behavior (e.g., torque output, power output) based in part on the behavior and/or performance of the user during the movement 1412 and through the feedback system of the application 1472 to provide a customized and configurable user experience. The exoskeleton boot 100 can be the same as or substantially similar to exoskeleton 100 described herein with respect to FIG. 1 or any type of exoskeleton described herein.

The exoskeleton boot 100 an include a controller 1402. The controller 1402 can be implemented using hardware or a combination of software and hardware. For example, each component of the controller 1402 can include logical circuitry (e.g., a central processing unit or CPU) that responses to and processes instructions fetched from a memory unit (e.g., memory 1404). Each component of the controller 1402 can include or use a microprocessor or a multi-core processor. A multi-core processor can include two or more processing units (e.g., processor 1406) on a single computing component. Each component of the controller 1402 can be based on any of these processors, or any other processor capable of operating as described herein. Each processor can utilize instruction level parallelism, thread level parallelism, different levels of cache, etc. For example, the controller 1402 can include at least one logic device such as a computing device having at least one processor 1406 to communicate, for example, with one or more client devices 1470, one or more exoskeleton boots 100 and/or one or more other controllers 1402 of one or more other exoskeleton boots 100. The components and elements of the controller 1402 can be separate components or a single component. The controller 1402 can include a memory component (e.g., memory 1404) to store and retrieve sensor data 1442 and control parameters 1410. The memory 1404 can include a random access memory (RAM) or other dynamic storage device, for storing information, and instructions to be executed by the controller 1402. The memory 1404 can include at least one read only memory (ROM) or other static storage device for storing static information and instructions for the controller 1402. The memory 1404 can include a solid state device, magnetic disk or optical disk, to persistently store information and instructions. The controller 1402 can be the same as or substantially similar to any controller or microcontroller described herein.

The controller 1402 and/or exoskeleton boot 100 can generate one or more control parameters 1410. The control parameters 1410 can include a command, an instruction, task or function provided to an exoskeleton boot 100 to instruct the exoskeleton boot 100 to generate target level or amount of torque, force, velocity or a combination of torque, force and velocity (e.g., impedance) and aid a user wearing the respective exoskeleton boot 100 in performing a movement 1412. The control parameters 1410 can include a data structure indicating a desired, requested or target torque, force and/or velocity level (e.g., torque 1414, power 1416). The control parameters 1410 can include, but are not limited to, battery requirements, power level, and/or power levels for an exoskeleton boot 100.

The controller 1402 and/or exoskeleton boot 100 can generate notifications 1450 to notify a user or operator of an exoskeleton boot 100 of changes in output (e.g., torque 1414, power 1416) of the exoskeleton boot 100 or operation of the exoskeleton boot 100. The notifications 1450 can include an alert, message, command, set of instructions or data structure. The notifications 1450 can include visual notifications, haptic notifications, tactile notifications and/or audio notifications, for example, provided through the application 1472 to provide feedback to the user to indicate if changes were made, what changes were made and/or indicate if the respective exoskeleton boot 100 is behaving appropriately. In embodiments, the notifications 1450 can include a message or alert indicating the user is not using the exoskeleton boot 100 appropriately (e.g., moving too slowly, moving too fast, coordination issues, body positioning issues) or that the exoskeleton boot 100 is not working correctly (e.g., power output issues, connection issues). The controller 1402 can use the notifications 1450 to communicate with a user or operator of the exoskeleton boot 100 to provide feedback to the user during one or more movements 1412 or activities performed by the user.

The controller 1402 and exoskeleton boot 100 can connect with, include or couple with a plurality of different sensors 1440 to monitor and detect device characteristics, user characteristics, biometrics, measurements, sensor data 1442, and/or properties of a route. The sensors 1440 can include a variety of different sensors to detect or measure, such as but is not limited to, device properties, gait state, joint angles, speed, and/or body positioning information. The sensors 1440 can include, but are not limited to, IMU sensors, joint angle sensors, motor sensors, voltage sensors, current sensors, temperature sensors, angle sensors, positional sensors, torque sensors, force sensors, velocity, accelerations, energy sensors, power sensors, and/or battery sensors. The sensors 1440 can include inertial measurement unit (IMU) sensors, goniometer, pedometer, infrared reflectors, force plates, electromyography (EMG), and/or heartrate monitors or sensors. The sensors 1440 can connect to or couple to couple to a client device 1470 and/or the application 1472 and the client device 1470 and/or application 1472 can communicate and/or exchange data with the controller 1402 through a connection 1462. In embodiments, additional sensor data can be received from network 1460 and received by the client device 1470, the application 1472 and/or the controller 1402.

The sensor data 1442 can include, but is not limited to, motion data, force data, torque data, temperature data, speed, gait transitions (e.g., gait event), angle measurements (e.g., of different joints of the user, joint angle measurements), biometrics, step count and/or movement information. The sensor data 1442 can include data corresponding to steady state activities or transient activities. The sensor data 1442 can include any form of data associated with, corresponding to or generated in response one or more movements 1412 and/or activities performed or executed by the user wearing one or more exoskeleton boots 100. For example, the sensor data 1442 can include data associated with a movement 1412 or motion performed or executed by the user and/or any type of use of one or more muscles of the user, for example, that may not involve motion (e.g., holding a position, standing) while wearing the exoskeleton boot 100. The sensor data 1442 can include ankle joint data, inertial measurement unit data, and/or battery data, power level data.

The sensor data 1442 can include inertial measurement unit (IMU) data, goniometer data, infrared reflector data, force plate data, electromyography (EMG) data, and heart-rate data. The sensor data 1442 can include data corresponding to motor values, voltage values, current, temperature, positional, state information, walking, running, gait state, stance, stance begin and end, swing, swing begin and end, peak plantarflexion, peak dorsiflexion, heel strike, toe off, body segment positions, orientations, velocity, acceleration, energy, power, power levels, battery, capacity, safety, warnings, and/or errors.

The controller 1402 and/or exoskeleton boot 100 can maintain one or more user profiles 1420. The user profile 1420 can include a data structure or entry in a database of the memory 1404 of the exoskeleton boot 100 for storing and maintained a plurality of user profiles 1420. The user profiles 1420 can be organized by user such that each a unique user profile 1420 is generated and maintained for each user, for example, during an initial use or operation of the exoskeleton boot 100. The user profiles 1420 can include historical sensor data for a user from one or more previous movements 1412 or activities performed by the user wearing the exoskeleton boot 100. The user profile 1420 can include sensor data 1442 generated and/or received during one or more previous movements 1412 or activities performed by the user wearing the exoskeleton boot 100. The user profile 1420 can include control parameters 1410 generated for one or more previous movements 1412 or activities performed by the user wearing the exoskeleton boot 100 and/or one or more future movements 1412 to be performed by the user wearing the exoskeleton boot 100. The user profile 1420 can include characteristics 1424 of the user, including but not limited to, personal characteristics, age, weight, height, gate information, a type of activity (e.g., walking, hiking, running, commuting, medical), activity level (e.g., sedentary, lightly, moderately, extremely active), experience level (e.g., experience with an exoskeleton system, novice, beginner, intermediate, advanced, expert), a level of augmentation (e.g., requested level of aid for upcoming activity using the exoskeleton), mode settings, additional sensor identification (e.g., sensors of other device user is wearing, heart rate, foot pod), limits, configuration data, and/or battery mode (e.g., power saver, average, extreme mode). In some embodiments, the characteristics 1424 can be determined, identified, learned or detected by an exoskeleton device 100.

The controller 1402 and/or exoskeleton boot 100 can maintain one or more group profiles 1422. The group profile 1422 can include a group of users involved in a common activity (e.g., military unit on a training mission, adventure group hiking) and/or a group of users having similar user characteristics (e.g., age, weight, height, gender, skill level, activity level). The group profile 1422 can include or link together a plurality of user profiles 1420 for a plurality of different users. The controller 1402 can use information from multiple different users and/or user profiles 1420 to generate control parameters 1410 for one or more users linked in the group profile 1422. In some embodiments, the controller 1402 can link multiple user profiles 1420 in a group profile 1422 for communications between exoskeleton boots 100 or devices worn by the different users participating in a common or group activity. For example, the group profile 1422 can enable communications between a military unit having two or more members such that the exoskeleton boots 100 worn by each user can communicate with one or more or all of the exoskeleton boots 100 worn by any of the other users in the respective group and generate control parameters 1410 using a larger data set (e.g., sensor data 1442 from each exoskeleton boot 100 in the group).

The movement 1412 can include any type of motion performed or executed by user and/or any type of use of one or more muscles of the user, for example, that may not involve motion (e.g., holding a position, standing). The movement 1412 can include can include, but is not limited to, physical activity, walking, running, standing, standing up, ascend or descend a surface (e.g., stairs), jogging, springing, jumping (e.g., single leg or both legs) squat, crouch, kneel or kick. The movement 1412 can include, but is not limited to, walking, running, gait state, gait transition (e.g., walking to running), stance begin and end, swing, swing begin and end, peak plantarflexion, peak dorsiflexion, heel strike, and/or toe off.

The controller 1402 and/or exoskeleton boot 100 can identify, determine, learn or detect one or more routes 1426. A route 1426 can include a course, a planned path, a distance to be traversed or traveled by a user, an unplanned path (e.g., actively changing path), and/or any type of way traveled by a user from a starting point to an end point. The controller 1402 and/or exoskeleton boot 100 can receive a route 1426 and/or route properties 1428 prior to a user starting the route 1426. The controller 1402 and/or exoskeleton boot 100 can determine or learn a route 1426 and/or route properties 1428 as a user is attempting the route 1426 or traversing the route 1426, for example, in real-time.

The controller 1402 and/or exoskeleton boot 100 can maintain one or more previously completed, attempted or planned routes 1426 in a database, user profile 1420 and/or group profile 1422. The route properties 1428 can include any type of detail, information, or description of a route 1426. The route properties 1428 can include, but are not limited to, limited to, a starting point, end point, global positioning system (GPS) data/coordinates, topology information, location information, altitude of one or more portions of the route 1426 and/or terrain details (e.g., water, land, swamp) of one or more portions of the route 1426.

The controller 1402 and/or exoskeleton boot 100 can generate a score 1452 indicating a rating, classification or ranking of a performance of the user during a movement 1412 using the exoskeleton boot 100. The score 1452 can be generated based in part on received sensor data 1442 for a movement 1412 and baseline parameters or target measurements for the respective movement 1412. For example, the movement 1412 may include baseline parameters or target sensor measurements (e.g., speed, timing of gait transitions, joint angle measurements). The baseline parameters can include general performance guidelines (e.g., parameters for a general population or large set of users). The target measurements based in part on the user characteristics, sensor data 1442 from a user profile 1420 of the user, sensor data 1442 from a group profile 1422 associated with the user, a performance of the user during one or more previous movements 1412 (e.g., same movements, similar movements, different movements) and/or a performance of one or more similar users during one or more previous movements 1412 (e.g., same movements, similar movements, different movements). The controller 1402 can compare the received sensor data 1442 from an active movement 1412 (e.g., in progress) or most recent movement 1412 to the baseline parameters and/or target measurements to determine how well the user is performing and to generate a score 1452. The score 1452 can indicate how well the user performed in view of the baseline parameters and/or target measurements (e.g., exceeded, met, reached, well below). The score 1452 can include a data structure, message or alert provided to the user, for example, through the application 1472 executing on the client device 1470 or exoskeleton boot 100.

The controller 1402 and exoskeleton boot 100 can determine and display a battery display 1430 that includes or corresponds to a level of the battery of the exoskeleton boot 100, a battery life and/or a measure of the battery performance and longevity of the battery of the exoskeleton boot 100. The battery 1430 can indicate a battery status meter, a battery charge level, a remaining battery life of the battery of the exoskeleton boot 100 and/or a battery life needed to complete a movement 1412. In some embodiments, the exoskeleton boot 100 and/or application 1472 can display or provide a first battery indicator 1430 indicating a current battery status and a second battery display 1430 indicating a battery life needed to complete a current movement 1412, activity and/or mission.

The controller 1402 and exoskeleton boot 100 can determine and display an augmentation display 1432 or multiple augmentation displays 1432, for example, one augmentation display 1432 for each leg (e.g., left lower limb, right lower limb). The augmentation display 1432 can indicate a level of aid or power that a respective exoskeleton boot 100 is outputting or providing to a user.

The controller 1402 and exoskeleton boot 100 can generate and display an augmentation slider (e.g., slider 1510 of FIGS. 15A-15B) for the augmentation 1432 configured to receive a user interaction and modify a level of the augmentation 1432 output or provided by a respective exoskeleton boot 100. In embodiments, the slider can be displayed through the application 1472 and/or a display of the exoskeleton boot 100. The slider can include a visual indication displaying different levels of augmentation 1432 available to user through the exoskeleton boot 100. The slider can move between the different levels of augmentation 1432, for example, for a user or operator to select a desired level of augmentation 1432 for a current movement 1412 or future movement 1412. In embodiments, the slider can receive a user interaction (e.g., click on, touch, hover, selection) and generate and transmit a signal or instructions to the controller 1402 and/or exoskeleton boot 100 to modify the level of the augmentation 1432 to the level selected by the user or operator of the exoskeleton boot 100.

The controller 1402 and exoskeleton boot 100 can determine and display a step count 1436 indicating a number of steps taken or performed by the user during a current or active movement 1412. In embodiments, the controller 1402 can receive sensor data 1442 such as from a pedometer connected to the exoskeleton boot 100 or the user (e.g., shoe, watch) and continuously determine and update the step count 1436 during the movement 1412. The controller 1402 and exoskeleton boot 100 can determine if the internal step count should be used or applied during the movement 1412, and/or use an external step count received from additional sensors, for example, sensors connected to the controller 1402 (e.g., pedometer). The controller 1402 can display the step count 1436 to a user through the application 1472 and/or a display of the exoskeleton boot 100.

The controller 1402 and exoskeleton boot 100 can determine a range calculation 1438 for a current movement 1412 or future movement 1412 or activity. The range calculation 1438 can include a distance for a route or path of a movement 1412 or activity. The range calculation 1438 can include an estimated distance for a route of a movement 1412 based in part on provided properties of a route (e.g., start point, end point, terrain, altitude). The properties of a route can include, but are not limited to, type of activity, distance, start point, end point, terrain, or altitude. The range calculation 1438 can be provided in any unit of length (e.g., U.S. customary units, international system of units (SI)), unit of measure or metric for measuring or determining distance, including but not limited to, miles, feet, meters, and/or kilometers. In some embodiments, the controller 1402 can generate multiple range calculation 1438 displays, for example, simultaneously. For example, the controller 1402 can generate a first range calculation 1438 showing a total distance for a route, a second range calculation 1438 showing a distance already traveled and/or a third range calculation 1438 showing a remaining distance. The controller 1402 can update or modify the range calculation 1438 or multiple range calculations 1438 during a movement, for example, in real-time as the user performs the respective movement 1412. The controller 1402 can display the range calculation 1438 or multiple range calculations 1438 to a user through the application 1472 and/or a display of the exoskeleton boot 100.

An application 1472 (e.g., user application, client application) can be provided to or deployed at the client device 1470 to enable a user to interact with an exoskeleton boot 100, receive feedback and/or provide feedback during one or more movements 1412 using the exoskeleton boot 100. The application 1472 can be any script, file, program, application, set of instructions, or computer-executable code, that is configured to enable a computing device (e.g., client device 1470) on which the application 1472 is executed to interact with the controller 1402 and/or exoskeleton boot 100. The application 1472 can establish a connection 1462 (e.g., session) with the controller 1402 and/or exoskeleton boot 100 to receive content from the controller 1402 and/or exoskeleton boot 100 and/or provide content to the controller 1402 and/or exoskeleton boot 100. In embodiments, the application 1472 (e.g., app, mobile application, etc.) can be used to deliver various functionalities. For example, the application 1472 can familiarize the user with the lower limb exoskeleton components. The application 1472 can teach the user how to connect the mobile application to the lower limb exoskeletons. The application 1472 can teach the user how to don and doff the lower limb exoskeleton. The application 1472 can teach the user how to charge and care for the battery. The application 1472 can teach the user how to train the controller to achieve personalized care. The application 1472 can teach the user how to read measurements of recovery. The application 1472 can teach the user how to manually adjust the controller to preference.

The device 1470 can include, but not limited to a client device, a computing device or a mobile device. The device 1470 can include or correspond to an instance of any client device, mobile device or computer device described herein. For example, the client device 1470 can be the same as or substantially similar to computing system 300 of FIG. 3 or computing system 1300 of FIG. 13. The device 14710 can include a display 1444. The display 1444 can be the same as or substantially similar to display 1335 of FIG. 3. The display 1444 can include, but is not limited to, a liquid crystal display, or active matrix display, for displaying information to a user. The display 1444 can include a touch screen display, for example, for a user to provide feedback through the user application 1472 to one or more exoskeleton boots 100. The display 1444 can be a component of an exoskeleton boot 100 or a device 1470.

A user interface 1446 (e.g., input device) can couple with or connect to the display 1444 and application 1472 to, for example, enable a user to interact with content provided through the display 1444 and application 1472. The user interface 1446 can include a graphical user interface (GUI) (e.g., a touchscreen, a display, etc.) and one or more input/output (I/O) devices (e.g., a mouse, a keyboard, a microphone, one or more speakers, one or more cameras, one or more biometric scanners, one or more environmental sensors, one or more accelerometers, etc.). In some embodiments, the user interface 1446 can be configured to receive audio feedback, tactile feedback and/or haptic feedback. In some embodiments, the user interface 1446 can include a microphone or audio receiver to receive or detect an audio signal (e.g., user talking, audio feedback) and/or provide an audio signal (e.g., provide audio feedback to the user). The user interface 1446 can include enable user interaction with content provided through the display 1444 and/or application 1472 and responsive to an interaction (e.g., select, click-on, touch, hover, audio), can generate a signal or response identifying a user input and/or selection of at least one content item provided to the user through the display 1444 and/or application 1472. The user interface 1446 can couple to or connect with the exoskeleton boot 100 and/or controller 1402 to provide the signal or response. The user interface 1446 can be the same as or substantially similar to the input device 1330 described above with respect to FIG. 13.

In embodiments, the client device 1470 and/or application 1472 can establish one or more connections 1462 to communicate with one or more other controllers 1402 (e.g., controllers of other exoskeleton devices) and/or one or more other exoskeleton boots 100. In some embodiments, the controller 1402 and/or exoskeleton 100 can establish one or more connections 1462 to communicate with one or more other controllers 1402 (e.g., controllers of other exoskeleton devices) and/or one or more other exoskeleton boots 100. The connection 1462 can include a link, channel, or session between two or more controllers 1402 and/or two or more exoskeleton boots 100. The connection 1462 can include an encrypted and/or secure sessions established between two or more controllers 1402 and/or two or more exoskeleton boots 100. The encrypted connection 1462 can include an encrypted file, encrypted data or traffic transmitted between the between two or more controllers 1402 and/or two or more exoskeleton boots 100. The controller 1402 can include a communications interface to enable the controller 1402 to access a computer network such as a LAN, a WAN, or the Internet through a variety of wired and/or wireless or cellular connections, for example, to establish a connection 1462.

In some embodiments, the connection 1462 can include a wireless connection or a Bluetooth connection. For example, the controller 1402 can use data (e.g., sensor data 1442) received via wireless communication (e.g., wireless connection 1462). In some embodiments, the exoskeleton boot 100 can include a bar code or tag that can be scanned by a client device 1470 or input device (e.g., scanner) connected to the client device 1470 to establish a connection 1462 between the client device 1470 and the exoskeleton boot 100. For example, the exoskeleton boot 100 can include, but is not limited to a quick response (QR) code or near field communication (NFC) tag and a scanner of or connected to the client device 1470 can scan or read the QR code or NFC tag to pair the exoskeleton boot 100 to the client device 1470. The network 1460 can include one or more private networks such as a local area network (LAN) or a company Intranet, and/or a public network, such as a wide area network (WAN) or the Internet. The network 1460 can include cell-phone networks: 4G, 5G, LTE, etc. The properties of the connection 1462 (e.g., wireless connection) can change or be modified based in part on a properties of the client device 1470 and/or a type of connection between the client device 1470 and the controller 1402 or exoskeleton boot 100. For example, in embodiments, the client device 1470 can include a personal computer and establish a Bluetooth type connection 1462 (e.g., Bluetooth 2.0 EDR) between the client device 1470 and controller 1402 and exoskeleton 100. In some embodiments, the client device 1470 can include a mobile device and establish a Bluetooth low energy connection 1462 between the client device 1470 and controller 1402 and exoskeleton 100 and the client device 1470 can detect the type and properties of the connection 1462 and select the appropriate protocol. In embodiments, the properties of the connection 1462, the type of information communicated, number of variables, data rate and/or exchange rate of the connection can be modified and/or adjusted based in part on the type of connection 1462 and devices using the connection 1462 to communicate.

The server 1490 can include a remote computing device and/or cloud computing device or service. The server 1490 can include a database to store and maintain one or more user profiles 1420 and one or more group profiles 1422. The client device 1470, application 1472, controller 1402 and/or exoskeleton boot 100 can connect to server 1490 through network 1460 and one or more connections 1462 to access user data including, but not limited to, a user profile 1420, group profile 1422, settings, account data, step count data 1436, walking controller models, and/or other forms of statistics recorded for a user. The server 1490 can transmit the data from the user profiles 1420 and/or group profiles 1422 to aid on or to augment computing capabilities (e.g., machine learning training) of the client device 1470 and/or exoskeleton boot 100. In embodiments, the client device 1470, application 1472, controller 1402 and/or exoskeleton boot 100 can connect to server 1490 through network 1460 and one or more connections 1462 to store or upload user data including, but not limited to, a user profile 1420, group profile 1422, settings, account data, step count data 1436, walking controller models, and/or other forms of statistics recorded for a user. The client device 1470, application 1472, controller 1402 and/or exoskeleton boot 100 can use the data from server 1490 to generate or process walking profiles, movement profiles from one or more users and/or determine an optimal profile to provide to a current or next user of the exoskeleton boot 100. In some embodiments, the server 1490 can store and maintain software updates (e.g., firmware updates) for the client device 1470, application 1472, controller 1402 and/or exoskeleton boot 100. In one embodiment, the server 1490 can transmit and provide firmware updates (e.g., wireless updates, over the air updates) to the client device 1470, application 1472, controller 1402 and/or exoskeleton boot 100 when new updates are generated and/or at determined intervals (e.g., weekly, monthly, etc.) through the network 1460 and connections 1462. In one embodiment, the client device 1470 can include or be programmed as a pass-through device and the server 1490 can use client device 1470 to perform read and/or write operations to and/or from controller 1402 and/or exoskeleton boot, for example, by bypassing settings (e.g., application settings) previously established. In embodiments, the client device 1470 can provide, enable or allow users to control an exoskeleton boot 100 using an accessible handheld computing device or mobile phone.

Figure 15A:
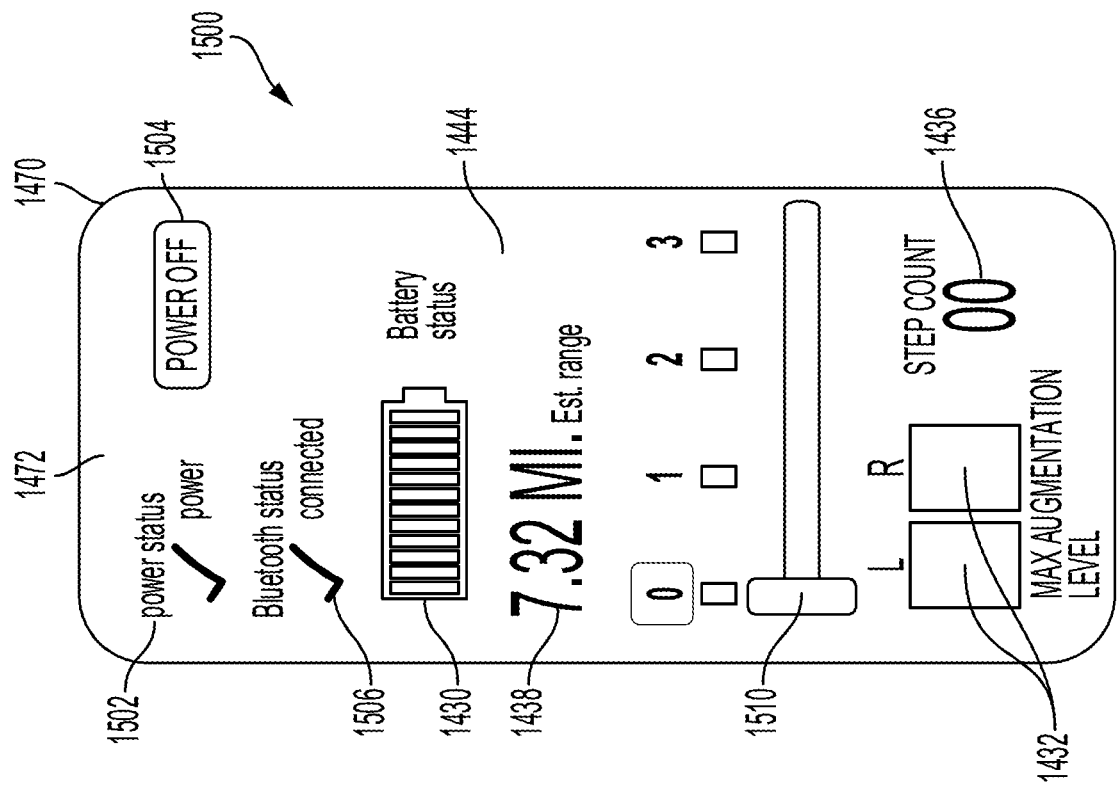
FIGS. 15A-15B illustrate diagrams of a user application for providing feedback to an exoskeleton system in accordance with an illustrative embodiment.
Figure 15B:
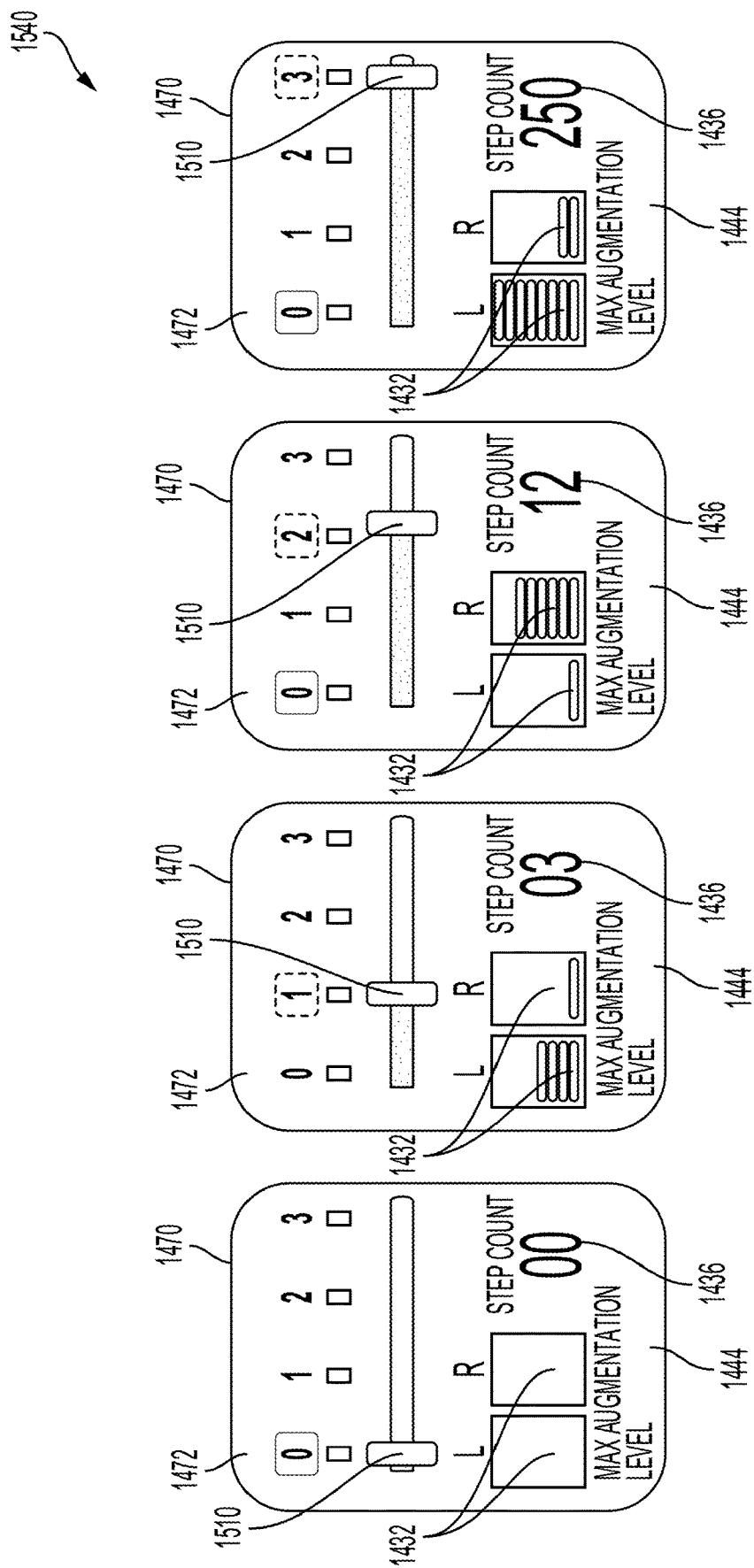

Referring to FIGS. 15A-15B, depicted are block diagrams 1500, 1540 of different embodiments of an application 1472 deployed at a client device 1470. FIG. 15A depicts an illustrative diagram 1500 of a user application 1472 provided through a display 1444 of a client device 1470 and showing one embodiment or arrangement of feedback and/or interactive elements for a user to provide feedback to one or more exoskeleton devices 100. In embodiments, FIG. 15B depicts a diagram 1540 of a user application 1472 provided through a display 1444 of a client device 1470 with a slider 1510 at different augmentation levels to modify an augmentation value 1432 of one or more exoskeleton devices 100 responsive to feedback from the user via the slider 1510. The application 1472 can be deployed at or executing at the client device 1470 to enable a user to interact with a controller 1402 of an exoskeleton boot 100, for example, to receive feedback and/or provide feedback. The feedback can include performance metrics, route properties, properties of the exoskeleton boot 100 and/or characteristics of the user. The application 1472 can be generated or designed in a plurality of different layouts based in part on the client device 1470 and/or feedback requested by a user of the exoskeleton boot 100. The embodiments of FIGS. 15A-15B provide two embodiments of the plurality of different layouts or information the application 1472 can provide to a user of an exoskeleton boot 100, however it should be appreciated that the presentation and/or layout of the application 1472 and elements and values provided through the application 1472 can include other presentations and/or layouts beyond those depicted in FIGS. 15A-15B. In some embodiments, the presentation and/or layout of the application 1472 and elements and values provided through the application 1472 can be selected, modified, or determined based in part on the properties of the device 1470, display 1444, user preferences, user feedback and/or a movement 1412 and/or route 1426.

The application 1472 can generate and display one or more indicators to indicate a status or value or the performance metrics, route properties, properties of the exoskeleton boot 100 and/or characteristics of the user. The application 1472 include a power status 1502. The power status 1502 can indicate a current power status (e.g., power on, power off) of the exoskeleton boot 100 the application 1472 is connected to and/or communicating with. The application 1472 include a power selection 1504. The power selection 1504 can power on or power off the application 1472 and end a connection 1462 to the exoskeleton boot 100. The power selection 1504 can power on or power off the exoskeleton boot 100 the application 1472 is connected to and/or communicating with.

The application 1472 include a connection status 1506. The connection status 1506 can indicate the status of the connection 1462 between the client device 1470 and the controller 1402 and/or exoskeleton boot 100. The connection status 1506 can indicate a type of connection 1462 between the client device 1470 and the controller 1402 and/or exoskeleton boot 100, for example, but not limited to, Bluetooth connection or wireless connection. The application 1472 include a battery status 1430. The battery status 1430 can indicate a current battery level of the exoskeleton boot 100 the application 1472 is connected to and/or communicating with or a remaining battery life of the exoskeleton boot 100 the application 1472 is connected to and/or communicating with. The application 1472 can include multiple battery status 1430, for example, a first battery status 1430 to indicate a current battery level of the exoskeleton boot 100 and a second battery status 1430 to indicate a battery life needed to complete a movement 1412 (e.g., activity, mission, multiple planned movements).

The application 1472 include a range value 1438. The range value 1438 can indicate estimated distance for a planned or upcoming movement 1412 or activity. The range value 1438 can be determined based in part on parameters provided by a user, through the application 1472, for the planned or upcoming movement 1412 or activity. The application 1472 can include multiple range values 1438, for example, a first range value 1438 to indicate a total distance of a movement 1412 and a second range value 1438 to indicate a remaining distance for the movement 1412. In some embodiments, the device 1470 and/or exoskeleton boot 100 can access or connect to a server (e.g., cloud server, remote server, third party server) to access or retrieve location information, GPS coordinates and/or a topology of an intended route. The device 1470 or exoskeleton boot 100 can determine the range value 1438 using the data accessed from the server and provide the range value 1438 to the user through the application 1472.

The application 1472 include a slider 1510 and one or more augmentation displays 1432. The augmentation display 1432 can indicate a level of aid or power that a respective exoskeleton boot 100 is outputting or providing to a user. The augmentation display 1432 can indicate a level of augmentation selected by the user through the slider 1510 for an exoskeleton boot to provide to a user during a movement 1412. The slider 1510 can include an input device indicator or user interaction tool configured to receive a user interaction and generate a signal indicating a desired level of augmentation based in part on a movement of the slider 1510. The slider 1510 can include a touch screen element configured to move across a portion of the display 1444 between different levels of augmentation, such that in response to a user interaction (e.g., touch, swipe, touch, slide and release), the user can select a desired level of augmentation by moving the slider 1510 between the different levels of augmentation. The application 1472 can determine a position of the slider 1510 when the slider 1510 is done moving and determine the selected level of augmentation and generate a signal to the controller 1402 and/or exoskeleton boot 100 indicating the selected level of augmentation. In embodiments, the slider 1510 can be used to select a level of augmentation before and/or during a movement 1412. The device 1470 through the application 1472 can update or modify the augmentation display 1432 responsive to the user interaction with the slider 1510, for example, to increase a level of augmentation provide an exoskeleton boot 100 or to decrease a level of augmentation provide an exoskeleton boot 100. The augmentation display 1432 can display a current or selected level of augmentation to the user to provide feedback to the user and indicate the current level of augmentation being provided or to be provided through the one or more exoskeleton boots 100.

The application 1472 include one or more step count 1436 indicators. For example, the application 1472 can generate a first step count 1436 indicator for a first foot (e.g., left foot) and a second step count 1436 indicator for a second, different foot (e.g., right foot). The step count indicators 1436 can indicate a number of steps taken or performed by a user during a current movement 1412 or activity. The step count 1436 can pro generated and displayed through the application 1472 in different forms, for example but not limited to, a bar graph or as a digital value (e.g., total number of steps for both feet, total number of steps for each foot individually). The application can include a power value 1416. The power value 1416 can indicate a current power (e.g., torque, force) output by the exoskeleton boot 100 to at least one limb of the user during a movement 1412.

Figure 16:
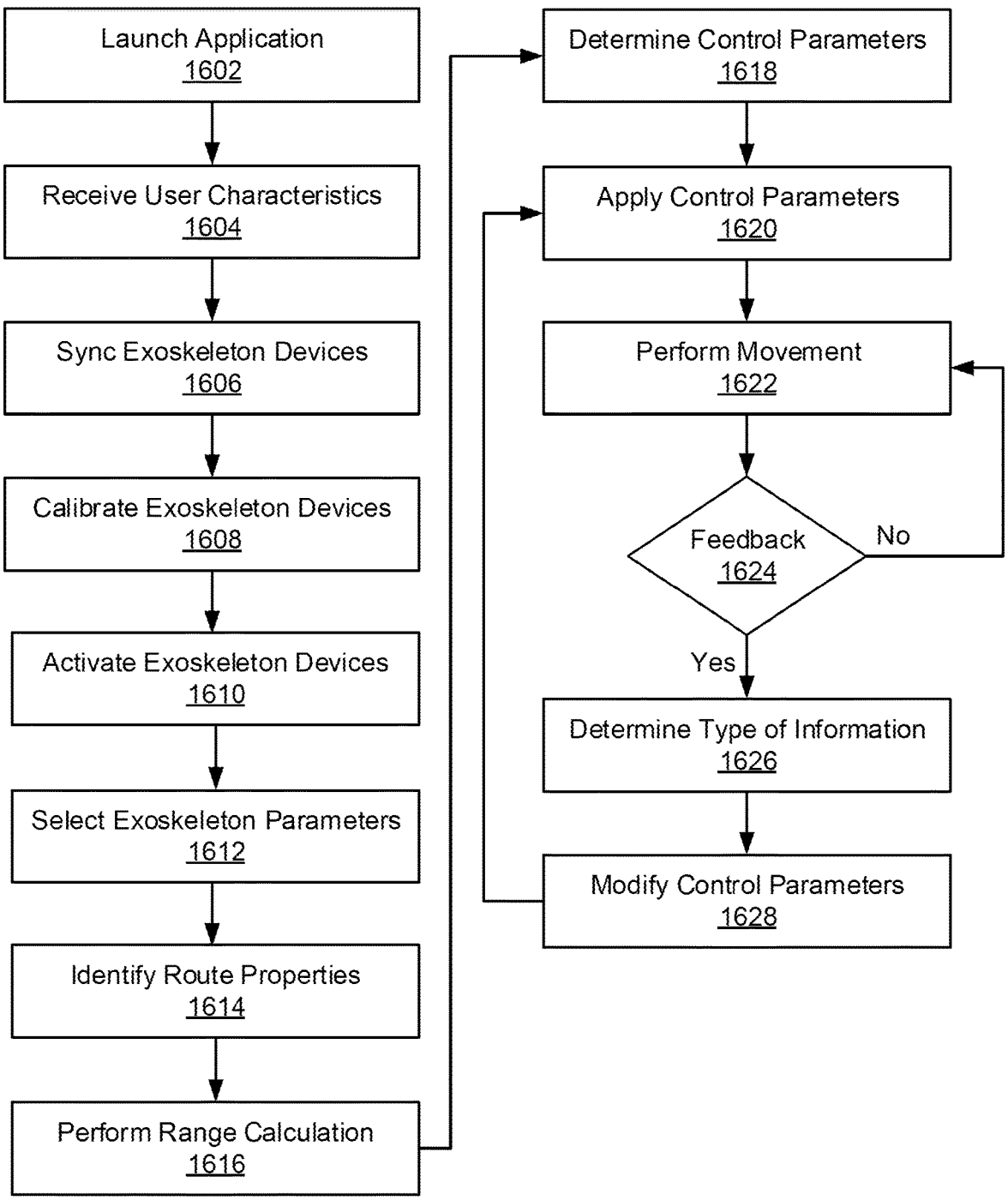
FIG. 16 is a flow chart illustrating a process or method for customizing configuration and operation of an exoskeleton device in accordance with an illustrative embodiment.

Now referring to FIG. 16, a method 1600 for customizing configuration and operation of an exoskeleton controller is provided. In brief overview, the method 1600 can include launching an application (1602), determining user characteristics (1604), synchronizing exoskeleton devices (1606), calibrating exoskeleton devices (1608), activating exoskeleton devices (1610), selecting exoskeleton parameters (1612), identifying route properties (1614), performing a range calculation (1616), determining control parameters (1618), applying control parameters (1620), performing a movement (1622), determining whether feedback has been provided (1624), identifying a type of information (1626), and modifying control parameters (1628). One or more of these operations may be performed by at least one processor and/or circuitry (e.g., processor 1406).

At operation 1602, and in some embodiments, an application can be launched. A user application 1472 (hereinafter application 1472) can be launched or activated on a client device 1470 of a user, on an exoskeleton device 100 or on a controller 1402 of an exoskeleton device 100. The exoskeleton device 100 can be referred to herein as an exoskeleton 100 and/or exoskeleton boot 100. The application 1472 can be executing on or provided by different devices and/or types of devices to enable a user to interact with and/or provide feedback to one or more exoskeleton devices 100. The application 1472 can include a mobile application, local application (e.g., native to a particular device the application is executing on), web application, software-as-a-service (SaaS) application and/or a network application. The application 1472 can be provided through a client application executing on a client device 1470 to provide a user access to applications 1472 (apps) that are served from and/or hosted on one or more servers, such as web applications and software-as-a-service (SaaS) applications (hereafter sometimes generally referred to as network applications). The client device 1470 can include any embodiment of a computing device described herein, including computing system 300 of FIG. 3 and/or computer system 300 of FIG. 13. The client device 1470 can include any user device such as a desktop computer, a laptop computer, a tablet device, a smart phone, or any other mobile or personal device. The client device 1470 can include a digital workspace of a user, which can include file system(s), cache or memory (e.g., including electronic clipboard(s)), container(s), application(s) and/or other resources on the client device 1470.

The application 1472 can automatically execute, or be activated by the user, for example, responsive to a user interaction with an icon of the application 1472 provided through the client device 1470, for example through display 1444. In some embodiments, the user can sign in to the application 1472 (e.g., by authenticating the user to the application 1472 through the client device 1470). A user can provide a username (e.g., identifier), log-in credentials and/or a password to authenticate to the application 1472 through the client device 1470. The username and/or password can be associated with at least one user profile 1420 stored and maintained for the respective user. The application 1472 can store and maintain a plurality of user profiles 146 for a plurality users in a storage device (e.g., memory) of an exoskeleton device 100 and/or database connected to the exoskeleton device 100. The user profiles 146 can include previously collected and/or generated characteristics 1424 of the respective user and previously generated control parameters 1410 for the user. In response to the login or sign-in, the application 1472 can register or authenticate the user and/or the client device 1470 with access to one or more exoskeletons devices 100.

At operation 1604, and in some embodiments, user characteristics can be determined. The device 1470 and/or exoskeleton device 100 can determine characteristics 1424 of the user for performing the movement event 1412 using a first exoskeleton boot 100 and a second exoskeleton boot 100. The device 1470 and/or exoskeleton device 100 can identify or receive the characteristics 1424 of the user for performing the movement event 1412 using a first exoskeleton device 100 and a second exoskeleton device 100, for example, from a database (e.g., memory 1404), user profile 1420 or server communicatively coupled to the device 1470 and/or exoskeleton device 100. The exoskeleton device 100 can receive, from a client device 1470 (e.g., or any device application 1472 is executing on) through the application 1472, characteristics 1424 of a user for performing a movement event 1412 using the first exoskeleton device 100 and the second exoskeleton 100. In some embodiments, a first exoskeleton device 100 can receive the characteristics 1424 from the device 1470 and provide or transmit the characteristics 1424 to the second exoskeleton device 100.

The application 1472 can receive characteristics 1424 from a user responsive to the user launching the application 1472. The characteristics 1424 can be used to initialize or customize a session using the exoskeleton devices 100 for the particular user and traits of the user. The characteristics 1424 can include, but not limited to, personal characteristics, age, weight, height, gate information, a type of activity (e.g., walking, hiking, running, commuting, medical), activity level (e.g., sedentary, lightly, moderately, extremely active), experience level (e.g., experience with an exoskeleton system, novice, beginner, intermediate, advanced, expert), a level of augmentation (e.g., requested level of aid for upcoming activity using the exoskeleton), mode settings, additional sensor identification (e.g., sensors of other device user is wearing, heart rate, foot pod), limits, configuration data, and/or battery mode (e.g., power saver, average, extreme mode). The characteristics 1424 can include a variety of different information for the exoskeleton device 100 to establish initial or baseline control parameters 1410 for the user for a planned activity or movement event 1412.

At operation 1606, and in some embodiments, exoskeleton devices 100 can be synchronized. The multiple exoskeleton devices 100 the user intends to use for a movement event 1412 and/or is wearing can synchronize or pair with each other. The exoskeleton devices 100 can pair and/or synchronize to set up an initial connection 1462 to enable communications and transfer of data between the exoskeleton devices 100. The controller 1402 can, responsive to a request from a user (e.g., paring request, sync request), establish a connection 1462 between a first exoskeleton device 100 and a second exoskeleton device 100. For example, a first exoskeleton device 100 can be attached to a leg or lower limb of the user and a second exoskeleton device 100 can be attached to a right leg or lower limb of the user. The two exoskeleton devices 100 can pair or synchronize through one or more connections 1462 (e.g., wireless) between the respective exoskeleton devices 100. In some embodiments, the exoskeleton devices 100 can pair through a Bluetooth component of each of the respective exoskeleton devices 100. The controller 1402 and/or exoskeleton boots 100 can establish the connection 1462 to communicate one or more measurements or sensor data 1442 during a movement 1412 or multiple movements 1412.

In some embodiments, the exoskeleton device 100 can connect with one or more sensors 1440 (e.g., heart rate monitor, foot pod, smartwatch sensors) and/or other client devices 1470 (e.g., smartwatch, headphones) of the user. The exoskeleton device 100 can pair (e.g., Bluetooth pairing) or synchronize with the sensors 1440 and/or other client devices 1470 to establish a connection 1462 between the exoskeleton device 100 and the sensors 1440 and client devices 1470. The sensors 1440 and client devices 1470 can transmit and provide data to one or more exoskeleton devices 100 the user is using through the connection 1462. The data can include, but not limited to, measurements, sensor data and other forms of tracking data for tracking a performance of the user during an activity and/or a movement event 1412 performed by the user. The client device 1470 and/or the exoskeleton device 100 can include a scanner (e.g., quick response (QR) scanner), and/or range mobile device. For example, the client device 1470 can scan a code, microchip or near field communication (NFC) tag attached to or associated with a sensor 1440 and/or other client device 1470 to pair and/or synchronize to the sensor 1440 or other client device 1470. The client device 1470 can pair the sensor 1440 and other client device 1470 to the one or more exoskeletons devices 100 of the user. In some embodiments, the exoskeleton device 100 can scan a code, microchip or near field communication (NFC) tag attached to or associated with a sensor 1440 and/or client device 1470 to pair and/or synchronize to the sensor 1440 or client device 1470.

At operation 1608, and in some embodiments, exoskeleton devices 100 can be calibrated. The exoskeleton devices 100 can calibrate components of the respective exoskeleton devices 100 to test whether the components (e.g., sensors 1440, battery 145, processor 1406, controller 1402) are activated, working and/or an accuracy of the values generated by the respective components. The exoskeletons devices 100 can transmit a test signal to a component requesting a response to identify the component as being activated and functioning. The exoskeleton devices 100 can perform a test of a sensor 1440 or tracking tool to determine an accuracy of the sensor 1440 or tracking tool 1440. For example, the exoskeleton device 100 can provide the sensor 1440 with a test value having a known measurement response or known response. The exoskeleton device 100 can compare the response value or response measurement from the sensor 1440 to an expected value (e.g., angle data, speed measurement, voltage, battery value) to determine the accuracy of the sensor 1440. If the returned value is correct or matches the expected value, the exoskeleton device 100 can identify, mark or tag the sensor 1440 as being calibrated. If the returned value is incorrect or does not match the expected value, the exoskeleton device 100 can test the sensor 1440 or component one or more additional times to calibrate the sensor 1440 or component. In some embodiments, the exoskeleton device 100 can make an adjustment or modification to the sensor 1440 or component that failed calibration to correct the error. If the subsequent tests also fail, the exoskeleton device 100 can generate a notification 1450 for the user though the client device 1470 to alert the user to the issue. The notification 1450 can identify the sensor 1440 or component of the exoskeleton device 100 that failed to calibrate and/or identify an issue with the sensor 1440 or component of the exoskeleton device 100.

At operation 1610, and in some embodiments, exoskeleton devices can be activated. The exoskeleton devices 100 can be activated or powered up to a functional power mode (e.g., full power mode, able to provide power and torque output). For example, during pairing and calibration, the exoskeleton devices 100 can be a low power mode or lower power mode that is less than a functioning power mode to preserve battery life. The exoskeleton devices 100 can power up to a functioning power mode to prepare to operate and augment a movement event 1412 of a user. The exoskeleton device 100 can generate a battery icon 1430 through a user interface 1446 of a client device 1470 and/or exoskeleton device 100 to show and display a current battery level of the exoskeleton device 100 and/or a power mode (e.g., functional power mode, full power mode, low power mode).

At operation 1612, and in some embodiments, exoskeleton parameters can be selected. The exoskeleton device 100 can select one or more parameters or initial parameters to control or guide the exoskeleton device 100 during a first or initial period of an activity a movement event 1412. The exoskeleton device 100 can select a level of augmentation indicating or corresponding to a power level and/or a torque level to provide to a user performing a movement event 1412. The level of augmentation can be selected responsive to a user interaction with the application 1472. For example, the application 1472 can display an interactive slider 1510 that moves between different levels of augmentation. The application 1472 can, responsive to a user interaction with the slider 1510, generate a signal indicating a selected target level of augmentation (e.g., augmentation display 1432) for the exoskeleton device 100. In some embodiments, the controller 1402 can receive from the client device 1470, through the application 1472, an augmentation value 1432 for the first exoskeleton device 100 and the second exoskeleton device 100. The augmentation values 1432 for each exoskeleton device 100 can be the same or different (e.g., injured leg). The application 1472 can transmit the signal to a controller 1402 of the exoskeleton device 100 to adjust or modify the level of augmentation to the selected level of augmentation. In some embodiments, the level of augmentation can be selected for the user based in part on the user characteristics and the movement 1412 to be performed. For example, the controller 1402 can select at least one predetermined level of augmentation that is determined based on previous movements 1412 involving the user, previous movements 14122 involving similar users and/or baseline levels of augmentation selected to different types of movements 1412.

The exoskeleton device 100 can select a power mode for a movement event 1412. The power mode can be based in part on the selected level of augmentation. In some embodiments, the parameters can be received from a client device 1470. For example, the client device 1470 can transmit a requested level of augmentation and/or power mode for a movement event 1412 to one or more exoskeleton devices 100. The user can enter the parameters through a user interface (e.g., touch screen, control pad, icon) of the client device 1470 to request a level of augmentation and/or power mode for the movement event 1412.

At operation 1614, and in some embodiments, route properties 1428 can be identified, calculated or determined. The exoskeleton device 100 can identify properties 1428 of a route 1426 to be taken for the movement event 1412. The exoskeleton device 100 can identify a starting point of the route 1426 and an end point for the route 1426. In some embodiments, the device 1470 and/or exoskeleton device 100 can connect to or access a server (e.g., server database, remote server, third party server) to retrieve distance information for a route 1426, topology information for a route 1426 and/or GPS coordinates corresponding to the starting point of the route 1426 and the end point for the route 1426. In some embodiments, the starting point and end point can be provided to the controller 1402 by the application 1472, for example, responsive to a user entering the starting point and end point. The application 1472 can receive a target destination and determine a current location of the client device 1470 and/or exoskeleton device 100 (e.g., starting point) and determine the route 1426.

The controller 1402 can determine or calculate properties 1428 of the route 1426, including but not limited to, altitude of one or more portions of the route 1426 or terrain details (e.g., water, land, swamp) of one or more portions of the route 1426. The controller 1402 can store and maintained altitude and/or terrain properties in the memory 1404 for one or more routes 1426 (e.g., previous routes, planned routes). In some embodiments, the controller 1402 can connect to a third party application or server to request and receive altitude and/or terrain properties for one or more routes 1426 and/or locations. The controller 1402 can determine a power level 1416 for the movement 1412 and route 1426. The power level 1416 can indicate a level or percentage of the battery 1430 a movement 1412 or route 1426 will take or require to be performed. The controller 1402 can determine the power level 1416 prior to initiating or performing a movement 1412 or initiating a route 1426 and generate an indication through the application 1472 and/or a user interface 1446 of the exoskeleton device 100 to notify the user of the power level 1416 needs for the planned movement 1412 and/or route 1426. The controller 1402 can determine multiple power levels 1416 for a route 1426. The route 1426 can include different portions having different terrain, altitude or one or more other different properties. The controller 1402 can determine a power level 1416 for each portion of the route 1426 and transition the exoskeleton device 100 between the different power levels 1416 as the user transverses the different portions of the route 1426.

At operation 1616, and in some embodiments, a range calculation can be performed. The controller 1402 and/or exoskeleton device 100 can perform a range calculation for the movement 1412 or route 1426 based on the user profile 1420, properties of the first lower limb exoskeleton device 100 and the second lower limb exoskeleton device 100 and/or data (e.g., distance, GPS information) received from a server or database. The controller 1402 can determine a total distance of the route 1426 and/or to perform the movement 1412. The controller 1402 can determine a range or distance for one or more portions of a route 1426 and provide the total range (e.g., total distance) and a range of each of the different portions forming the route 1426 to a user through the application 1472. In some embodiments, the controller 1402 determine a range or distance for multiple routes 1426 including the planned route 1426 and one or more alternative routes 1426 having the same or similar start and end points as possible alternatives (e.g., faster route, less altitude, less terrain hazards) to the planned route 1426.

The controller 1402 can determine a measurement of the battery status 1430 (e.g., current battery level) and/or a battery requirement for the movement 1412 or route 1426 using the range calculation and a provided augmentation value 1432. The relationship between the current battery status 1430 or battery reserve power, the power level 1416 and the determined range 1438 can be critical to completing a movement 1412 and/or route 1426 (e.g., mission). The controller 1402 can determine if the exoskeleton boots 100 have enough battery 1430 to complete the movement 1412 and/or route 1426, for example, so that a user can make an informed decision on whether to complete the movement 1412 and/or route 1426 or modify the movement 1412 and/or route 1426. The compare the battery status 1430 to the power level 1416 to determine if the exoskeleton device 100 has enough battery power 1430 to complete the movement and/or route 1426. The controller 1402 can generate a notification 1450 to the user through the application 1472 to indicate if the exoskeleton device 100 has enough battery power 1430 to complete the movement and/or route 1426 or if the exoskeleton device 100 does not have enough battery power 1430 to complete the movement and/or route 1426.

At operation 1618, and in some embodiments, control parameters 1410 can be determined. The controller 1402 and/or exoskeleton device 100 can determine control parameters 1410 for the exoskeleton boots 100. The controller 1402 can determine the control parameters 1410 using the characteristics 1424 of the user and the properties of the route 1426 and/or movement 1412 for the exoskeleton boots 100 to perform the movement 1412 and/or complete the route 1426, for example, by providing power or torque to lower limbs of the user. The control parameters 1410 can include a command, an instruction, task or function provided to an exoskeleton device 100 to instruct the exoskeleton device 100 to generate target level or amount of torque, force, velocity or a combination of torque, force and velocity (e.g., impedance) and aid a user wearing the respective exoskeleton device 100 in performing a movement 1412. The control parameters 1410 can include a data structure indicating a desired, requested or target torque, force and/or velocity level (e.g., torque 1414, power 1416). The control parameters 1410 can include, but are not limited to, battery requirements, power level, and/or power levels for an exoskeleton device 100. The control parameters 1410 can include battery requirements, power level, and/or power levels for each step performed using the first exoskeleton device 100 and the second exoskeleton device 100.

At operation 1620, and in some embodiments, control parameters 1410 can be applied. The controller 1402 can provide or apply the control parameters 1410 to the first exoskeleton device 100 and the second exoskeleton device 100 for the user to operate the first exoskeleton device 100 and the second exoskeleton device 100 during the movement 1412 and/or the route 1426. The controller 1402 can instruct or command the respective exoskeleton boots to set a torque value 1414 to a target level, set a force level to a target level, a power level 1416 to a target level, and/or velocity level to a target level using the determined control parameters 1410. The controller 1402 can increase a torque value 1414 to a target level, set a force level to a target level, a power level 1416 to a target level, and/or velocity level to a target level based in part on the control parameters 1410. The controller 1402 can initiate movement of the exoskeleton boots 100 such that the exoskeleton boots 100 output a target torque value 1414, target force level, target power level 1416 and/or target velocity level to perform a movement 1412 and/or route 1426.

The controller 1402 can calibrate or sync, using the connection 1462, the control parameters 1410 between the first exoskeleton device 100 and the second exoskeleton device 100. The controller 1402 can provide the same level or value of power 1416 (or torque, force, velocity) to each exoskeleton device 100 (e.g., same to each leg) or provide different levels or values of power 1416 (or torque, force, velocity) to each exoskeleton device 100 based in part on the user characteristics (e.g., injury to one leg, injury to an ankle on one leg). The controller 1402 can, responsive to the range calculation, provide a first value of power 1416 to the first exoskeleton device 100 and a second value of power 1416 to the second exoskeleton device 100 to execute the movement 1412 and/or complete the route 1426. The first value of power 1416 and the second value of power 1416 can be the same or equal values or different values. The controller 1402 can determine the first value of power 1416 for the first exoskeleton device 100 and the second value of power 1416 for the second exoskeleton device 100 based on at least one of: a weight of the user, a height of the user or an age of the user.

At operation 1622, and in some embodiments, a movement can be performed. The first exoskeleton device 100 and second exoskeleton device 100 can perform a movement 1412 and/or augment or aid a user in performing the movement 1412 by providing the torque 1414 and/or power 1416 indicated by the control parameters 1410. The exoskeleton boots 100 can provide force, torque and/or power to the lower limb of the user the respective exoskeleton device 100 is coupled to with to augment the movement of the user during the activity 1412. The movements 1412 can include, but not limited to, walking, running, standing, standing up, ascend or descend a surface (e.g., stairs), jogging, springing, jumping (e.g., single leg or both legs) squat, crouch, kneel or kick. The exoskeleton boots 100 can transfer energy to the lower limb of the user to augment the movement of the user during the movement 1412 or multiple movements 1412. The exoskeleton boots 100 can reduce a difficulty of performing the respective movement 1412 or multiple movements 1412 by reducing the energy or effort the user exerts to perform the respective movement 1412.

The controller 1402 can display metrics through the application 1472 during the movement 1412, after the movement 1412 completes and/or as the user transverses the route 1426. The metrics can include but not limited to, a step count 1436, a battery status 1430, a range calculation 1438, a torque level 1414 and/or a power level 1416. The controller 1402 can generate and display the step count 1436, battery status 1430, range calculation 1438, torque level 1414 and/or power level 1416 through the application 1472 as the movement 1412 is performed and/or as the route 1426 is completed. The controller 1402 can provide, to the user through the client device 1470 and application 1472, a first step count 1436 for the first exoskeleton device 100 and a second step count 1436 for the second exoskeleton device 100. The controller 1402 can continuously modify (e.g., in real-time), the step count 1436, battery status 1430, range calculation 1438, torque level 1414 and/or power level 1416 through the application 1472 as the movement 1412 is performed and/or as the route 1426 is completed.

At operation 1624, and in some embodiments, a determination can be made whether or not feedback has been provided. The controller 1402 and/or exoskeleton device 100 can determine whether or not feedback has been received from the application 1472 and/or from the exoskeleton device 100. The feedback can include feedback generated and provided by the exoskeleton device 100, including but not limited to, an issue with the exoskeleton device 100, a performance issue by the user and/or exoskeleton device 100 during the movement 1412. The feedback can include feedback received from the application 1472 and provided by a user, including but not limited to, a performance rating (e.g., going well, struggling, need more augmentation), a new level of augmentation received via the slider 1510 of the application 1472, a movement modification, a route modification and/or a performance issue associated with the user and/or exoskeleton device 100 during the movement 1412. In embodiments, if no feedback has been received, the method 1600 can return to (1622) to perform a next movement 1412 or continue performing a current movement 1412. In embodiments, if feedback has been received, the method 1600 can go to (1624) to determine a type of information received.

At operation 1626, and in some embodiments, a type of information can be identified. The controller 1402 can determine the type of information received in the feedback and a source of the feedback. The type of information can include performance information, including but not limited to, sensor data 1442, a score 1452 for the user performing the movement 1412, a missed step, and/or a missed portion of the movement 1412. In some embodiments, the exoskeleton device 100 can determine a step was missed or a gait transition was missed during the movement 1412 and generate an notification indicating the step missed or missed gait transition during the movement 1412 for the controller 1402 and/or application 1472, for example, to notify the user. The controller 1402 can determine a missed step or missed gait transition responsive to an input from the user via the application 1472 indicating that the step or multiple steps were missed. The type of information can include modifications or requests to modify one or more control parameters 1410. The controller 1402 can receive feedback request to increase or decrease a level of augmentation 1432, a level of torque 1414 and/or a level of power 1416. The type of information can include modifications to the movement 1412, a subsequent movement 1412 and/or a route 1426. The type of information can include modifications or requests to modify one or more control parameters 1410. The controller 1402 can receive feedback request to increase or decrease a level of augmentation 1432, a level of torque 1414 and/or a level of power 1416. The type of information can include modifications to the movement 1412, a subsequent movement 1412 and/or a route 1426.

The controller 1402 can generate a score 1452 for the user based in part on received sensor data 1442 and/or other forms of feedback. The score 1452 can indicate how well the user performed the movement 1412, one or more previous movements 1412 or one or more portions of a current movement 1412. The score 1452 can indicate if the user performed the movement 1412 correctly or if the movement 1412 was performed incorrectly (e.g., missed step, missed gait transition). The controller 1402 can use the score 1452 to determine modifications to the control parameters 1410, for example, to aid the user if performing the movement 1412 or a next movement 1412 correctly.

At operation 1628, and in some embodiments, control parameters can be modified. The controller 1402 can modify one or more control parameters 1410 of the exoskeleton boots 100 for one or more next movements 1412 or to continue a current movement 1412. In embodiments, the controller can modify, responsive to at least one of a measurement of the user during the movement 1412 (e.g., sensor data 1442), feedback or score 1452, one or more control parameters 1410 of the exoskeleton boots 100 for one or more next movements 1412 or to continue a current movement 1412. The modifications can include changes to a torque 1414 and/or a power 1416 provided to the first exoskeleton device 100 and the second exoskeleton during the movement event. The controller 1402 can increase or decrease a current level of the torque 1414 and/or power 1416 provided to the exoskeleton boots 100 or provided by the exoskeleton boots 100. The modifications can include changes to an augmentation level 1434 provided by the exoskeleton boots 100. In embodiments, the controller 1402 can modify, responsive to at least one of a measurement of the user during the movement 1412 (e.g., sensor data 1442), feedback or score 1452, an augmentation value 1432 for the first exoskeleton device 100 and the second exoskeleton device 100.

In embodiments, the controller 1402 can modify the control parameters 1410 based in part on a group profile 1422 the respective user is associated with or currently performing one or more movements 1412 with. The controller 1402 can generate a group profile 1422 for a group of users based on one or more previous movement events 1412 and modify, using group profile 1422, the control parameters 1410 for the user (or multiple users in the group profile 1422) to operate the first exoskeleton device 100 and the second exoskeleton device 100 during the movement 1412 or for a subsequent movement 1412. The group profile 1422 can include a group of users involved in a common activity (e.g., military unit on a training mission, adventure group hiking) and/or a group of users having similar user characteristics (e.g., age, weight, height, gender, skill level, activity level). The controller 1402 can use information from multiple different users and/or user profiles 1420 to generate and/or modify control parameters 1410 for one or more users linked in the group profile 1422. In some embodiments, the controller 1402 can link multiple user profiles 1420 in a group profile 1422 for communications between exoskeleton boots 100 or devices worn by the different users participating in a common or group activity. The group profile 1422 can enable communications between a military unit having two or more members such that the exoskeleton boots 100 worn by each user can communicate with one or more or all of the exoskeleton boots 100 worn by any of the other users in the respective group and generate control parameters 1410 using a larger data set (e.g., sensor data 1442 from each exoskeleton device 100 in the group). In some embodiments, the method 1600 can return to (1604) and (1614) to modify, update or determine user characteristics 1424 based in part on the received feedback and/or modify, update or identify route properties 1428 for the route 1426 or a new or subsequent route 1426 based in part on the received feedback prior to applying the modified control parameters 1410.

In embodiments, the method 1600 can return to (1620) to apply the modified control parameters to the exoskeleton boots 100. For example, the controller 1402 can provide or apply the modified control parameters 1410 to the first exoskeleton device 100 and the second exoskeleton device 100 for the user to operate the first exoskeleton device 100 and the second exoskeleton device 100 during a current movement 1412, one or more subsequent movements 1412 and/or to transverse the route 1426. The controller 1402 can instruct or command the respective exoskeleton boots to set a torque value 1414 to the modified level, set a force level to the modified level, a power level 1416 to modified level, and/or velocity level to modified level using the modified control parameters 1410. The controller 1402 can increase or decrease a torque value 1414 to the modified level, increase or decrease a force level to the modified level, increase or decrease a power level 1416 to the modified level, and/or increase or decrease a velocity level to modified level.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that can be generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium may not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement features of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various implementations.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for controlling operation of exoskeleton boots, the method comprising:
   receiving, by a device via a user interface, feedback from a user indicative of a performance of the user during a movement event;
   determining, by the device, characteristics of the user for performing the movement event using a first exoskeleton boot and a second exoskeleton boot;
   identifying, by the device, properties of a route for the movement event;
   determining, by a device using the characteristics of the user, the feedback and the properties of the route, control parameters for the first exoskeleton boot and the second exoskeleton boot to execute the movement event; and
   applying, by the device, the control parameters to the first exoskeleton boot and the second exoskeleton boot for the user to operate the first exoskeleton boot and the second exoskeleton boot during the movement event.

2. The method of claim 1, wherein the characteristics of the user include at least one of: age, weight, height, gate information, or activity level.

3. The method of claim 1, wherein the properties of the route include at least one of: type of activity, distance, start point, end point, terrain, or altitude.

4. The method of claim 1, wherein the control parameters include at least one of: battery requirements, power level, power levels for each step performed using the first exoskeleton boot and the second exoskeleton boot.

5. The method of claim 1, further comprising:
   modifying, by the device responsive to a measurement of the user during the movement event, the control parameters during the movement event to modify a power provided to the first exoskeleton boot and the second exoskeleton boot during the movement event.

6. The method of claim 1, further comprising:
   establishing, by the device, a connection between the first exoskeleton boot and the second exoskeleton boot to communicate one or more measurements during the movement event.

7. The method of claim 1, further comprising:
   determining, by the device responsive to an input from the user, a step missed during the movement event; and
   generating, by the device, a notification indicating the step missed during the movement event.

8. The method of claim 1, further comprising:
   generating, by the device, a group profile for a group of users based on one or more previous movement events; and
   modifying, by the device using group profile, the control parameters for the user to operate the first exoskeleton boot and the second exoskeleton boot during the movement event.

9. The method of claim 1, further comprising:
   determining, by the device, a score for the user during the movement event based on measurements from the first exoskeleton boot and the second exoskeleton boot.

10. A method for controlling operation of exoskeleton boots, the method comprising:
    establishing, by a device responsive to a request from a user, a connection between a first exoskeleton boot and a second exoskeleton boot;
    identifying, by the device, a user profile associated with the user;
    performing, by the device, a range calculation for a movement event based on the user profile and properties of the first exoskeleton boot and the second exoskeleton boot; and
    providing, by the device responsive to the range calculation, a first value of power to the first exoskeleton boot and a second value of power to the second exoskeleton boot to execute the movement event.

11. The method of claim 10, further comprising:
    calibrating, by the device using the connection, control parameters between the first exoskeleton boot and the second exoskeleton boot.

12. The method of claim 10, further comprising:
    determining, by the device responsive to the range calculation, the first value of power for the first exoskeleton boot and the second value of power for the second exoskeleton boot to execute the movement event based on at least one of: a weight of the user, a height of the user or an age of the user.

13. The method of claim 10, further comprising:
receiving, by the device from a user interface, an augmentation value for the first exoskeleton boot and the second exoskeleton boot, the augmentation value indicative of a level of assistance provided by the first exoskeleton boot and the second exoskeleton boot to the user during the movement event.

14. The method of claim 10, further comprising:
modifying, by the device responsive to a measurement indicative of a performance of the user during the movement event, an augmentation value for the first exoskeleton boot and the second exoskeleton boot, the augmentation value indicative of a level of assistance provided by the first exoskeleton boot and the second exoskeleton boot to the user during the movement event.

15. The method of claim 10, further comprising:
determining, by the device, a measurement of a battery status or battery requirement for the movement event using a range calculation and a provided augmentation value.

16. The method of claim 10, further comprising:
providing, by the device to the user through a user interface, a first step count for the first exoskeleton boot and a second step count for the second exoskeleton boot, the first step count indicating a number of steps performed by the first exoskeleton boot during the movement event and the second step count indicating a number of steps performed by the second exoskeleton boot during the movement event.

17. The method of claim 16, further comprising:
continuously modifying, the device responsive to actions by the user, the first step count for the first exoskeleton boot and the second step count for the second exoskeleton boot during the movement event.

18. A device for controlling operation of exoskeleton boots, the device comprising:
a processor coupled to memory, the processor configured to:
receive, from a use interface communicatively coupled to the device, feedback from the user indicative of a performance of the user during a movement event;
determine characteristics of the user for performing the movement event using a first exoskeleton boot and a second exoskeleton boot;
identify properties of a route for the movement event;
determine, using the characteristics of the user, the feedback, and the properties of the route, control parameters for the first exoskeleton boot and the second exoskeleton boot to execute the movement event; and
apply the control parameters to the first exoskeleton boot and the second exoskeleton boot for the user to operate the first exoskeleton boot and the second exoskeleton boot during the movement event.

19. The device of claim 18, wherein the processor is further configured to:
modify, responsive to a measurement of the user during the movement event, the control parameters during the movement event to modify a power provided to the first exoskeleton boot and the second exoskeleton boot during the movement event.

20. The device of claim 18, wherein the processor is further configured to:
establish a connection between the first exoskeleton boot and the second exoskeleton boot to communicate one or more measurements during the movement event.

\* \* \* \* \*